(12) United States Patent
Hinosugi et al.

(10) Patent No.: US 7,743,268 B2
(45) Date of Patent: Jun. 22, 2010

(54) APPARATUS, METHOD, AND PROGRAM FOR COMMUNICATION

(75) Inventors: Mitsuki Hinosugi, Kanagawa (JP); Hiroshi Kyusojin, Tokyo (JP); Hideki Matsumoto, Tokyo (JP); Masato Kajimoto, Chiba (JP); Tsuyoshi Kano, Tokyo (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 11/672,386

(22) Filed: Feb. 7, 2007

(65) Prior Publication Data

US 2007/0183786 A1 Aug. 9, 2007

(30) Foreign Application Priority Data

Feb. 8, 2006 (JP) .......................... P2006-030485

(51) Int. Cl.
G06F 1/32 (2006.01)
G06F 1/26 (2006.01)
(52) U.S. Cl. ........................ 713/320; 713/300; 370/463; 370/465
(58) Field of Classification Search ................. 713/300, 713/320; 370/463, 465
See application file for complete search history.

(56) References Cited

U.S. PATENT DOCUMENTS

| | | | | |
|---|---|---|---|---|
| 7,249,271 | B2* | 7/2007 | Shibata et al. | 713/324 |
| 7,343,500 | B2* | 3/2008 | Igari | 713/300 |
| 7,506,188 | B2* | 3/2009 | Krantz et al. | 713/320 |
| 2005/0169356 | A1* | 8/2005 | Matsumoto et al. | 375/220 |
| 2005/0201411 | A1* | 9/2005 | Shibata et al. | 370/463 |
| 2005/0235171 | A1* | 10/2005 | Igari | 713/323 |
| 2005/0268010 | A1* | 12/2005 | Igari | 710/100 |
| 2006/0069932 | A1* | 3/2006 | Oshikawa et al. | 713/300 |

OTHER PUBLICATIONS

IEEE Std 802.3-2002 Section Two, "28. Physical Layer link signaling for 10 Mb/s, 100 Mb/s and 1000 Mb/s Auto-Negotiation on twisted pair", Mar. 8, 2002, pp. 213-260, IEEE.

* cited by examiner

Primary Examiner—Thomas Lee
Assistant Examiner—Vincent T Tran
(74) Attorney, Agent, or Firm—K&L Gates LLP

(57) ABSTRACT

A communication apparatus is provided. The communication apparatus includes a transmission unit adapted to transmit data via a network, a receiving unit adapted to receive data supplied via the network, an interface unit adapted to supply to-be-transmitted data to the transmission unit and extract particular information from data received by the receiving unit, and a control unit configured to control an operation state of the interface unit.

14 Claims, 21 Drawing Sheets

APPARATUS, METHOD, AND PROGRAM FOR COMMUNICATION

CROSS REFERENCES TO RELATED APPLICATIONS

The present application claims priority to Japanese Patent Application JP 2006-030485 filed in the Japanese Patent Office on Feb. 8, 2006, the entire contents of which is incorporated herein by reference.

BACKGROUND

The present disclosure relates to an apparatus, method and program for communication, and more particularly, to an apparatus, method and program for communication, which allow a reduction in power consumption.

In an Ethernet® network system, it is known to perform auto-negotiation to optimize communication (see for example, IEEE Std 802.3-2002 Section Two, "28. Physical Layer link signaling for 10 Mb/s, 100 Mb/s and 1000 Mb/s Auto-Negotiation on twisted pair", 8 Mar. 2002, Pages 213-260, IEEE). In the auto-negotiation, a network device sends a pulse signal (a link pulse signal) to another network device with which to communicate to notify it of the allowable communication speed or the communication mode.

However, the auto-negotiation is for optimization of communication, but reduction in power consumption of network devices connected to each other is not taken into account.

In recent years, a great increase in the communication speed has been achieved, and a corresponding increase in the operating frequency and operating speed of network devices have been achieved. However, this results in an increase in power consumption, and thus there is now a need to reduce the power consumption.

In the case of a 10 Gigabit Ethernet® system according to the standard IEEE802.2ae established by IEEE (Institute of Electrical and Electronic Engineers), it is required to use an optical cable as a transmission medium to achieve a high transmission speed. However, a network device adapted to transmit/receive an optical signal needs high power consumption, and thus it is very desirable to reduce the power consumption.

SUMMARY

In view of the above, the present embodiments provide a technique to reduce power consumption, as described below in detail.

According to an embodiment, a communication apparatus is provided comprising a transmission unit adapted to transmit data via a network, a receiving unit adapted to receive data supplied via the network, and an interface unit adapted to supply to-be-transmitted data to the transmission unit and extract particular information from data received by the receiving unit, the communication apparatus further comprising control means for controlling an operation state of the interface unit.

In this communication apparatus, the interface unit may include a data shaping/analyzing unit and an encoding/decoding unit, the data shaping/analyzing unit being adapted to shape data to be transmitted and analyze received data, the encoding/decoding unit being adapted to encode data to be transmitted and decode received data, and the control means may control both the data shaping/analyzing unit and the encoding/decoding unit.

In the communication apparatus, the control means may control switching of the operation state of the interface unit between a transmission/reception-enabled state in which a process associated with transmission of data to be transmitted and a process associated with reception of incoming data are possible and a sleep state in which operation is stopped to reduce power consumption.

In the communication apparatus, the control means may include state setting means for outputting state setting information indicating an operation state into which to set the communication apparatus, and the interface unit may switch the operation state in accordance with the state setting information set by the state setting means.

In the communication apparatus, the state setting means may output, as the state setting information, information indicating one of the following four states: an idle state in which transmission and reception of information is possible; an active state in which an information processing apparatus adapted to transmit and receive data via the communication apparatus is in a transmission/reception—enabled state in which transmission/reception is possible and the interface unit is in a sleep state in which operation is stopped to reduce power consumption; a passive state in which both the interface unit and the information processing apparatus adapted to transmit and receive data via the communication apparatus are in the sleep state; and an off-state in which no electric power is supplied and no operation is performed, and when the state setting information specifies the active state or the passive state, the interface unit may go into the sleep state, while when state setting information specifies the idle state, the interface unit may go into the state in which transmission and reception are possible.

In the communication apparatus, the control means may further include state notification producing means for producing, in accordance with the state setting information, state notification information which indicates the operation state of the present communication apparatus and which is to be sent to another communication apparatus via the transmission unit.

In the communication apparatus, the state notification producing means may output a link pulse signal such that when the state setting information indicates the active state, the state notification producing means outputs an active link pulse signal corresponding to the active state, while when the state setting information indicates the passive state, the state notification producing means outputs a passive link pulse: signal corresponding to the possible state and being different from the active link pulse signal.

In the communication apparatus, the transmission unit may be an optical transmitter adapted to output signal light, and the state notification producing means may operate such that when the state setting information specifies the idle state, the state notification producing means makes the transmission unit start outputting the signal light, when the state setting information specifies the off-state, the state notification producing means makes the transmission unit stop outputting the signal light, when the state setting information specifies the active state, the state notification producing means controls turning-on/off of the signal light output by the transmission unit so as to output the active link pulse signal, and when the state setting information specifies the passive state, the state notification producing means controls turning-on/off of the signal light output by the transmission unit so as to output the passive link pulse signal.

In the communication apparatus, the control means may further include state notification detection means for detecting state notification information supplied from another communication apparatus, from the signal received by the receiving unit, and the state setting means may output the state setting information according to a result of the detection by the state notification detection means.

In the communication apparatus, the state setting means may set the state setting information such that when the state setting information indicates the idle state, if the result of the detection by the state notification detection means is a failure of detection of the received signal by the receiving unit, or if the result of the detection is a detection of a passive link pulse signal in the form of a pulse sequence corresponding to the passive state, then the state setting means sets the state setting information so as to indicate the active state, if the information processing apparatus is in the transmission/reception-enabled state.

In the communication apparatus, the state setting means may set the state setting information such that when the state setting information indicates the idle state, if the result of the detection by the state notification detection means is a failure of detection of the received signal or if the result of the detection is a detection of a passive link pulse signal in the form of a pulse sequence corresponding to the passive state, then the state setting means sets the state setting information so as to indicate the passive state, if the information processing apparatus is in the sleep state.

In the communication apparatus, the state setting means may set the state setting information such that when the state setting information indicates the active state, if the result of the detection by the state notification detection means is a detection of the received signal over a predetermined period of time or if the result of the detection is a detection of an active link pulse signal in the form of a pulse sequence corresponding to the active state, then the state setting means sets the state setting information so as to indicate the idle state.

In the communication apparatus, the state setting means may set the state setting information such that when the state setting information indicates the passive state, if the result of the detection by the state notification detection means is a detection of the received signal over a predetermined period of time or if the result of the detection is a detection of an active link pulse signal in the form of a pulse sequence corresponding to the active state, then the state setting means sets the state setting information so as to indicate the idle state and furthermore the state setting means outputs activation control information to the information processing apparatus to change the state of the information processing apparatus from the sleep state into the transmission/reception-enabled state.

In the communication apparatus, the receiving unit may be an optical receiver adapted to receive an optical signal, and the state notification detection means may detect a state notification on the basis of a turning-on/off pattern of the optical signal received by the receiving unit.

According to an embodiment, there is provided a communication method for communication by a communication apparatus comprising a transmission unit adapted to transmit data via a network, a receiving unit adapted to receive data supplied via the network, and an interface unit adapted to supply to-be-transmitted data to the transmission unit and extract particular information from data received by the receiving unit. The method includes controlling an operation state of the interface unit.

According to an embodiment, there is provided a computer program stored on a computer readable medium including executable instructions that when executed by a processor performs steps associated with a communication apparatus. The communication apparatus includes a transmission unit adapted to transmit data via a network, a receiving unit adapted to receive data supplied via the network, and an interface unit adapted to supply to-be-transmitted data to the transmission unit and extract particular information from data received by the receiving unit. The steps include controlling an operation state of the interface unit.

As described above, the present embodiments provide a communication apparatus comprising a transmission unit adapted to transmit data via a network, a receiving unit adapted to receive data supplied via the network, and an interface unit adapted to supply to-be-transmitted data to the transmission unit and extract particular information from data received by the receiving unit. The communication apparatus is characterized in that an operation state of the interface unit is controlled.

The present embodiments provide a great advantage that a reduction in power consumption is achieved.

Additional features and advantages are described herein, and will be apparent from, the following Detailed Description and the figures.

DETAILED DESCRIPTION

Before the embodiments are described, correspondences between specific examples of parts/steps in the embodiments and those in the respective claims are described. Note that the purpose of the following description is to indicate that specific examples corresponding to the respective claims are described in the embodiments, and thus the purpose of the following description is not to limit specific examples of the respective claims to those described below. That is, there can be a part/step that is not described in the following description of the correspondence but that corresponds to a part/step of a particular claim. Conversely, an example of a part/step, which is described in the following description as corresponding to a particular claim, can correspond to a part/step of another claim.

According to an embodiment of the present invention, there is provided a communication apparatus (a network interface shown in FIG. 1) comprising a transmission unit (a PMD-TX shown in FIG. 1) adapted to transmit data via a network (for example, an optical cable shown in FIG. 1), a receiving unit (a PMD-RX shown in FIG. 1) adapted to receive data supplied via the network, and an interface unit (an interface unit shown in FIG. 1) adapted to supply to-be-transmitted data to the transmission unit and extract particular information from data received by the receiving unit, the communication apparatus further comprising control means (a state controller shown in FIG. 1) for controlling an operation state of the interface unit.

The interface unit may include a data shaping/analyzing unit (a MAC frame generator shown in FIG. 1) and an encoding/decoding unit (a PCS shown in FIG. 1), the data shaping/analyzing unit being adapted to shape data to be transmitted and analyze received data, the encoding/decoding unit being adapted to encode data to be transmitted and decode received data, and the control means may control both the data shaping/analyzing unit and the encoding/decoding unit.

Figure 7:
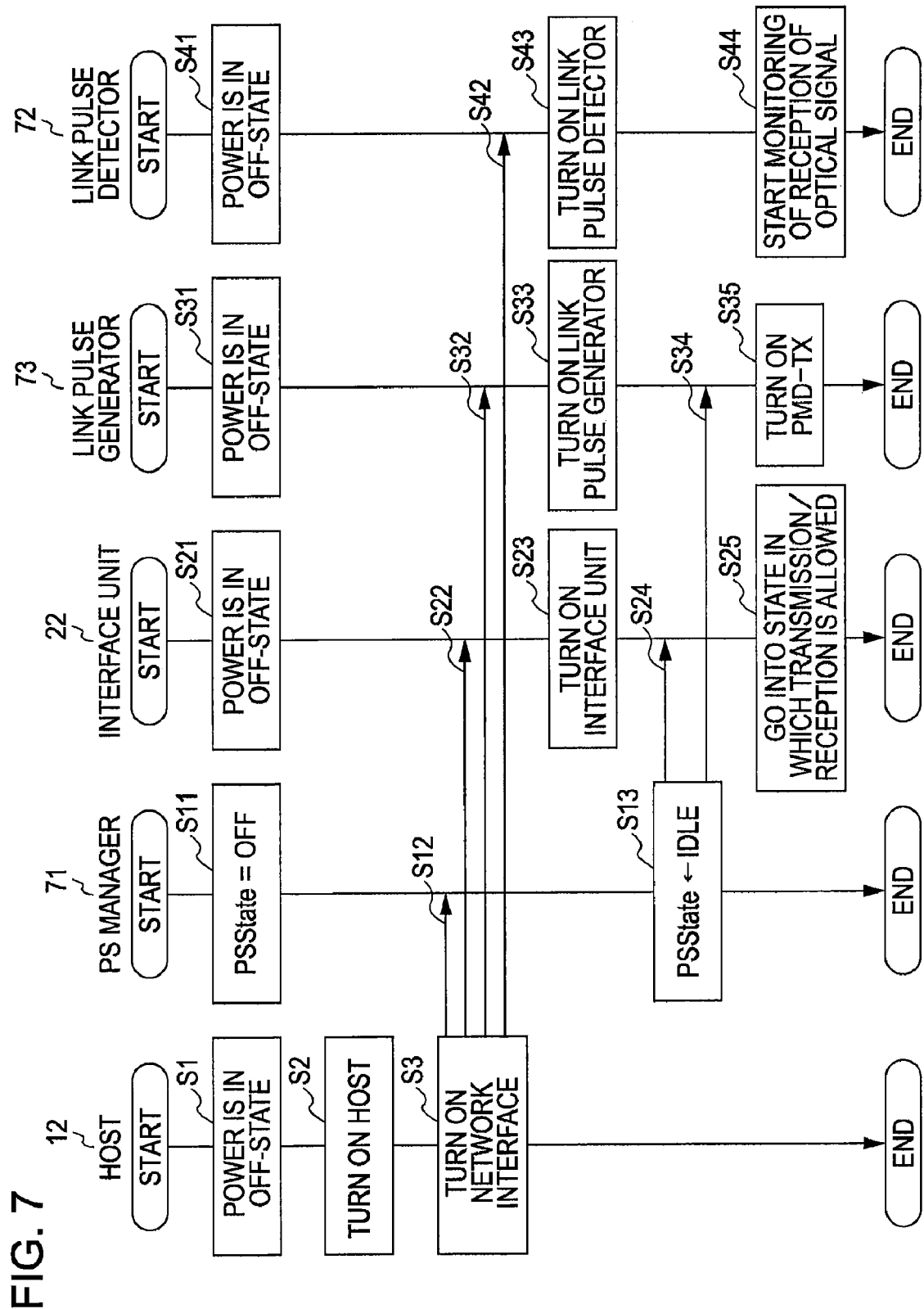
FIG. 7 is a flow chart showing an example of a processing flow in which a state transition occurs from an off-state (OFF) to an idle state (IDLE)
Figure 8:
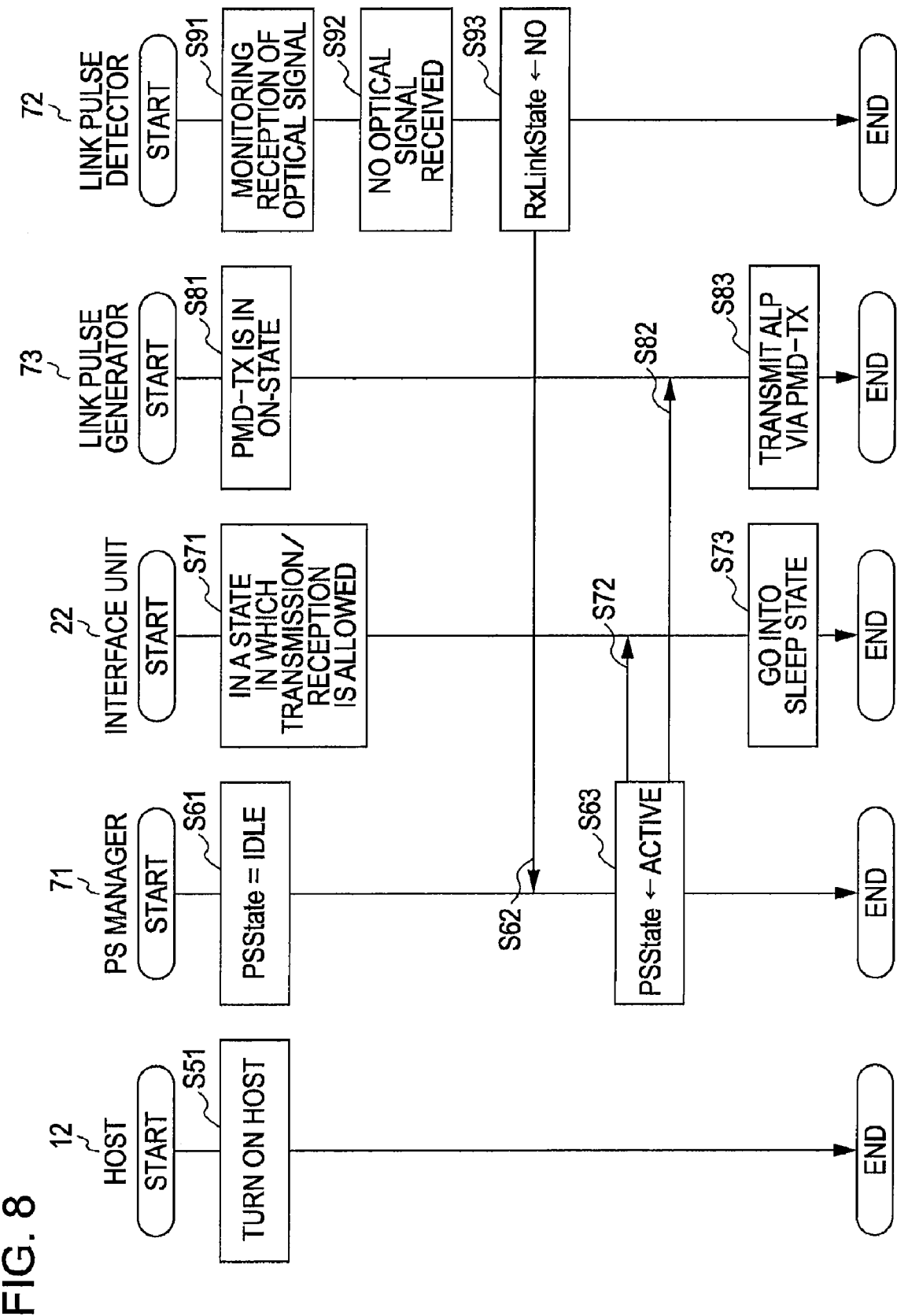
FIG. 8 is a flow chart showing an example of processing flow in which a state transition occurs from an idle state (IDLE) to an active state (ACTIVE)

The control means may control switching of the operation state of the interface unit between a transmission/reception-enabled state in which a process associated with transmission of data to be transmitted and a process associated with reception of incoming data are possible and a sleep state in which operation is stopped to reduce power consumption (for example, in step S13 in FIG. 7 or step S63 in FIG. 8).

The control means may include state setting means (a PS manager shown in FIG. 1) for outputting state setting information indicating an operation state into which to set the communication apparatus, the interface unit may switch the operation state in accordance with the state setting information set by the state setting means.

Figure 9:
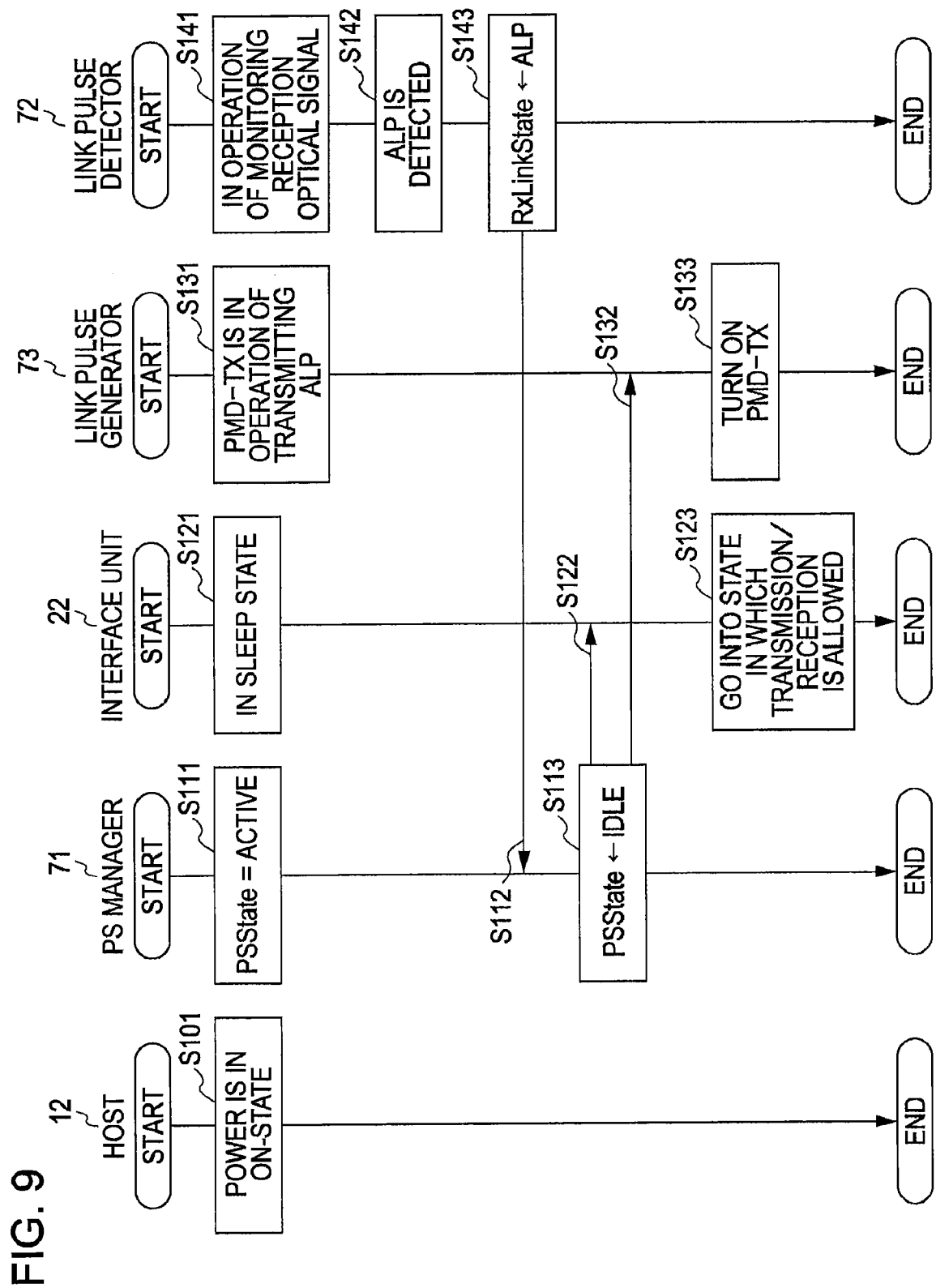
FIG. 9 is a flow chart showing an example of a processing flow in which a state transition occurs from an active state (ACTIVE) to an idle state (IDLE)
Figure 10:
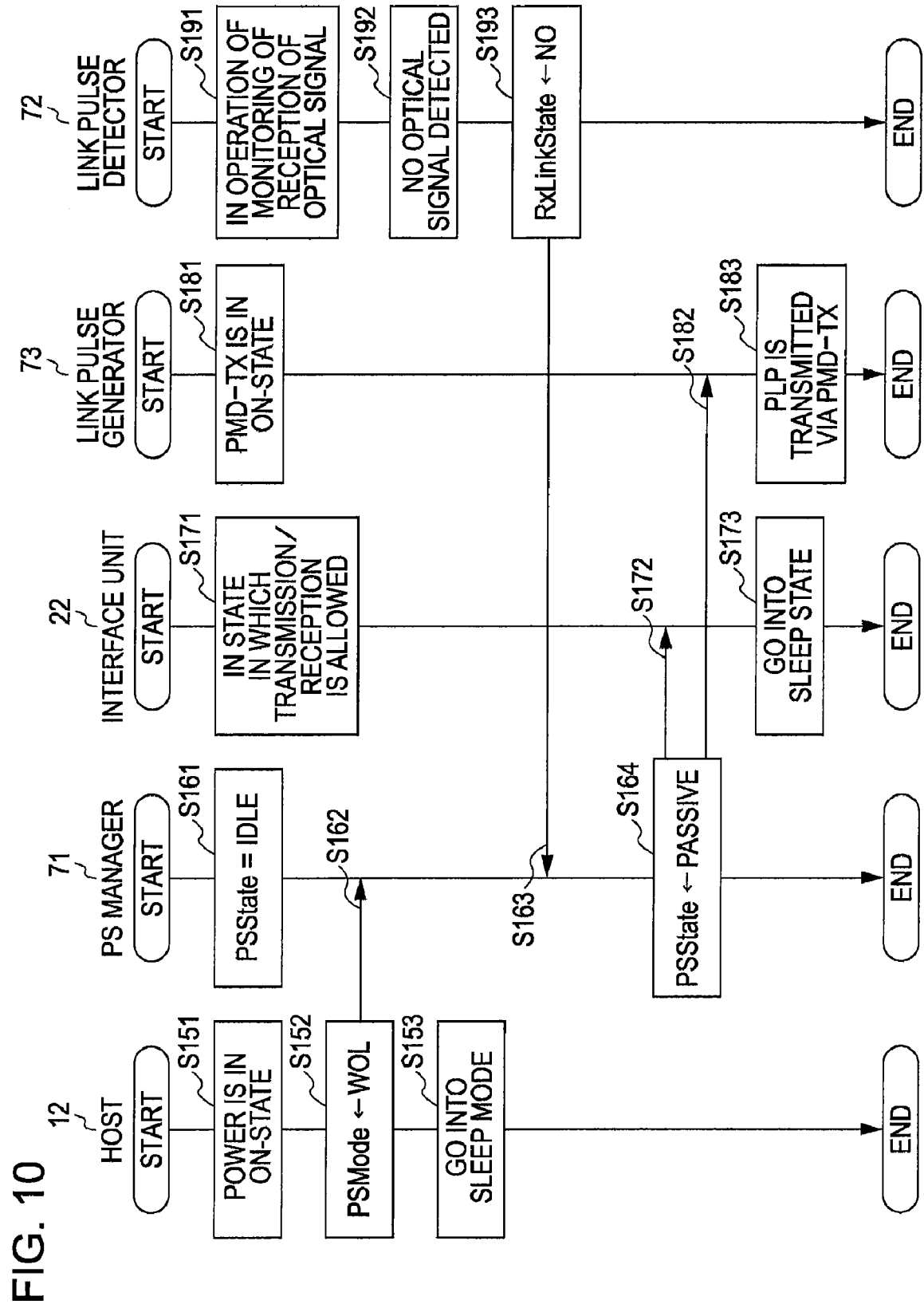
FIG. 10 is a flow chart showing an example of a processing flow in which a state transition occurs from an idle state (IDLE) to a passive state (PASSIVE)
Figure 11:
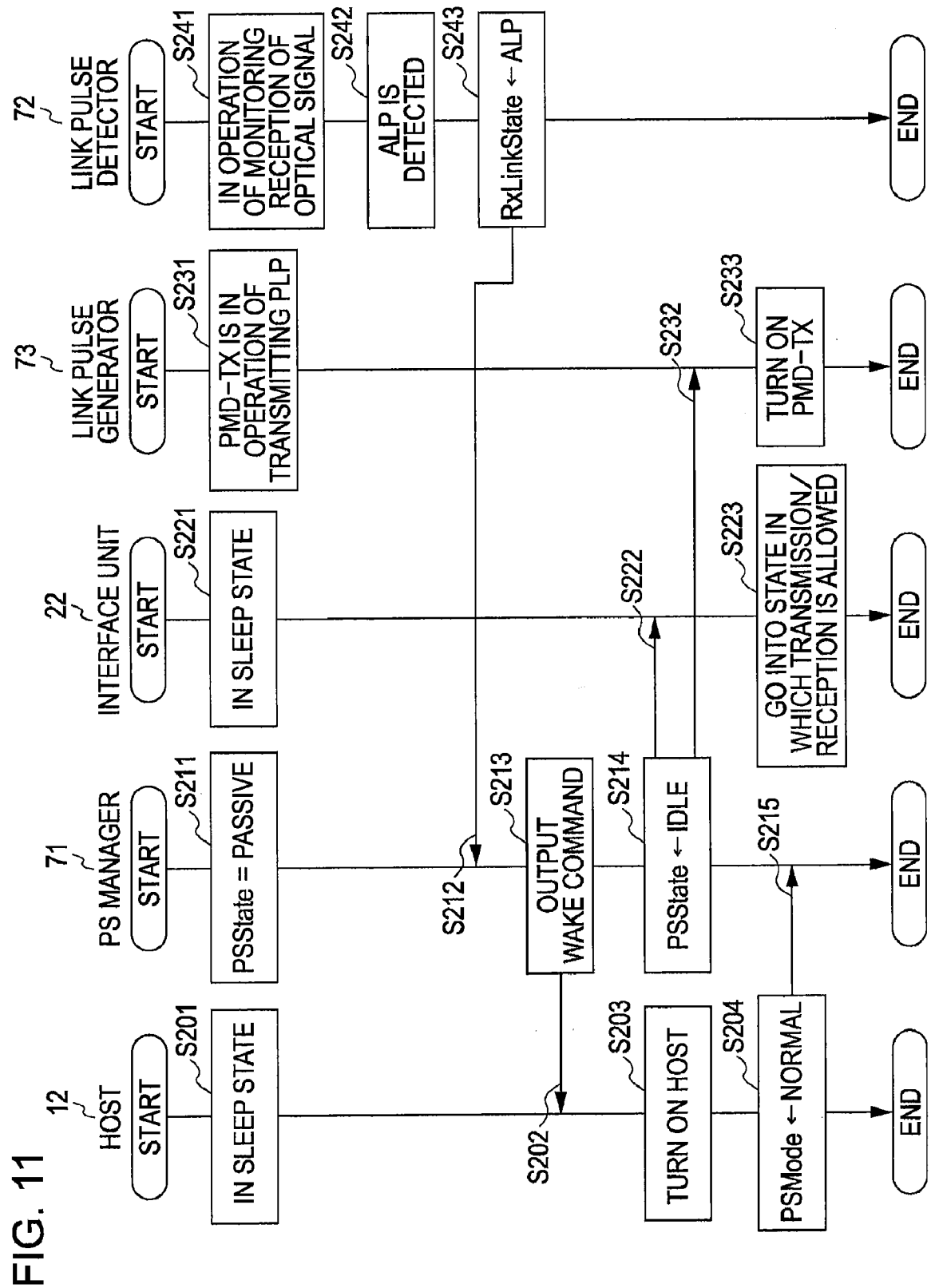
FIG. 11 is a flow chart showing an example of a processing flow in which a state transition occurs from a passive state (PASSIVE) to an idle state (IDLE)

The state setting means may output, as the state setting information, information indicating one of the following four states: an idle state (for example, IDLE 112 shown in FIG. 3) in which transmission and reception of information is possible; an active state (for example, ACTIVE 113 shown in FIG. 3) in which an information processing apparatus adapted to transmit and receive data via the communication apparatus is in a transmission/reception-enabled state in which transmission/reception is possible and the interface unit is in a sleep state in which operation is stopped to reduce power consumption; a passive state (for example, PASSIVE 114 shown in FIG. 3) in which both the interface unit and the information processing apparatus adapted to transmit and receive data via the communication apparatus are in the sleep state; and an off-state (for example, OFF 111 shown in FIG. 3) in which no electric power is supplied and no operation is performed; when the state setting information specifies the active state or the passive state, the interface unit may go into the sleep state (for example, in step S73 in FIG. 8 or step 5173 in FIG. 10), while when state setting information specifies the idle state, the interface unit may go into the state in which transmission and reception are possible (for example, in step 5123 in FIG. 9 or step 5223 in FIG. 11).

The control means may further include state notification producing means (for example, a link pulse generator shown in FIG. 1) for producing, in accordance with the state setting information, state notification information which indicates the operation state of the present communication apparatus and which is to be sent to another communication apparatus via the transmission unit.

Figure 18:
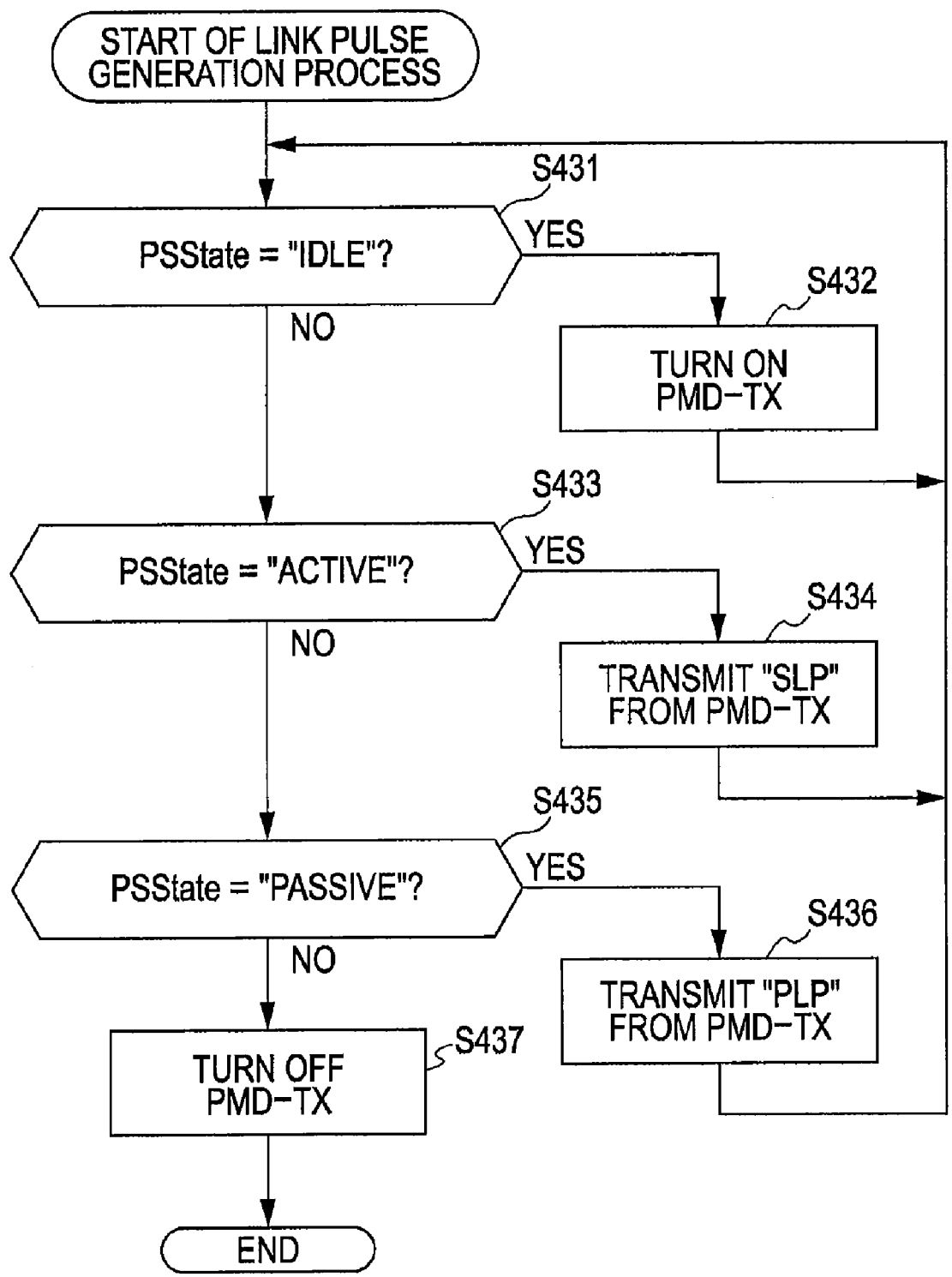
FIG. 18 is a flow chart showing an example of a process of generating a link pulse signal.

The state notification producing means may output a link pulse signal such that when the state setting information indicates the active state, the state notification producing means outputs an active link pulse signal corresponding to the active state (for example, in step 5434 in FIG. 18), while when the state setting information indicates the passive state, the state notification producing means outputs a passive link pulse signal corresponding to the possible state and being different from the active link pulse signal (for example, in step S436 in FIG. 18).

The transmission unit may be an optical transmitter (for example, a PMD-TX shown in FIG. 1) adapted to output signal light, and the state notification producing means may operate such that when the state setting information specifies the idle state, the state notification producing means makes the transmission unit start outputting the signal light (for example, in step 5432 shown in FIG. 18), when the state setting information specifies the off-state, the state notification producing means makes the transmission unit stop outputting the signal light (for example, in step 5437 shown in FIG. 18), when the state setting information specifies the active state, the state notification producing means controls turning-on/off of the signal light output by the transmission unit so as to output the active link pulse signal (for example, in step 5434 shown in FIG. 18), and when the state setting information specifies the passive state, the state notification producing means controls turning-on/off of the signal light output by the transmission unit so as to output the passive link pulse signal (for example, in step 5436 shown in FIG. 18).

The control means may further include state notification detection means (for example, a link pulse detector shown in FIG. 1) for detecting state notification information supplied from another communication apparatus, from the signal received by the receiving unit, and the state setting means may output the state setting information according to a result of the detection by the state notification detection means.

The state setting means may set the state setting information such that when the state setting information indicates the idle state, if the result of the detection by the state notification detection means is a failure of detection of the received signal by the receiving unit, or if the result of the detection is a detection of a passive link pulse signal in the form of a pulse sequence corresponding to the passive state, then the state setting means sets the state setting information so as to indicate the active state, if the information processing apparatus is in the transmission/reception-enabled state (for example, in step S63 in FIG. 8).

The state setting means may set the state setting information such that when the state setting information indicates the idle state, if the result of the detection by the state notification detection means is a failure of detection of the received signal or if the result of the detection is a detection of a passive link pulse signal in the form of a pulse sequence corresponding to the passive state, then the state setting means sets the state setting information so as to indicate the passive state, if the information processing apparatus is in the sleep state (for example, in step S164 in FIG. 10).

The state setting means may set the state setting information such that when the state setting information indicates the active state, if the result of the detection by the state notification detection means is a detection of the received signal over a predetermined period of time or if the result of the detection is a detection of an active link pulse signal in the form of a pulse sequence corresponding to the active state, then the state setting means sets the state setting information so as to indicate the idle state (for example, in step 5113 in FIG. 9).

The state setting means may set the state setting information such that when the state setting information indicates the passive state, if the result of the detection by the state notification detection means is a detection of the received signal over a predetermined period of time or if the result of the detection is a detection of an active link pulse signal in the form of a pulse sequence corresponding to the active state, then the state setting means sets the state setting information so as to indicate the idle state (for example, in step 5214 in FIG. 11), and furthermore the state setting means outputs activation control information to the information processing apparatus to change the state of the information processing apparatus from the sleep state into the transmission/reception-enabled state (for example, in step S213 in FIG. 11).

Figure 13:
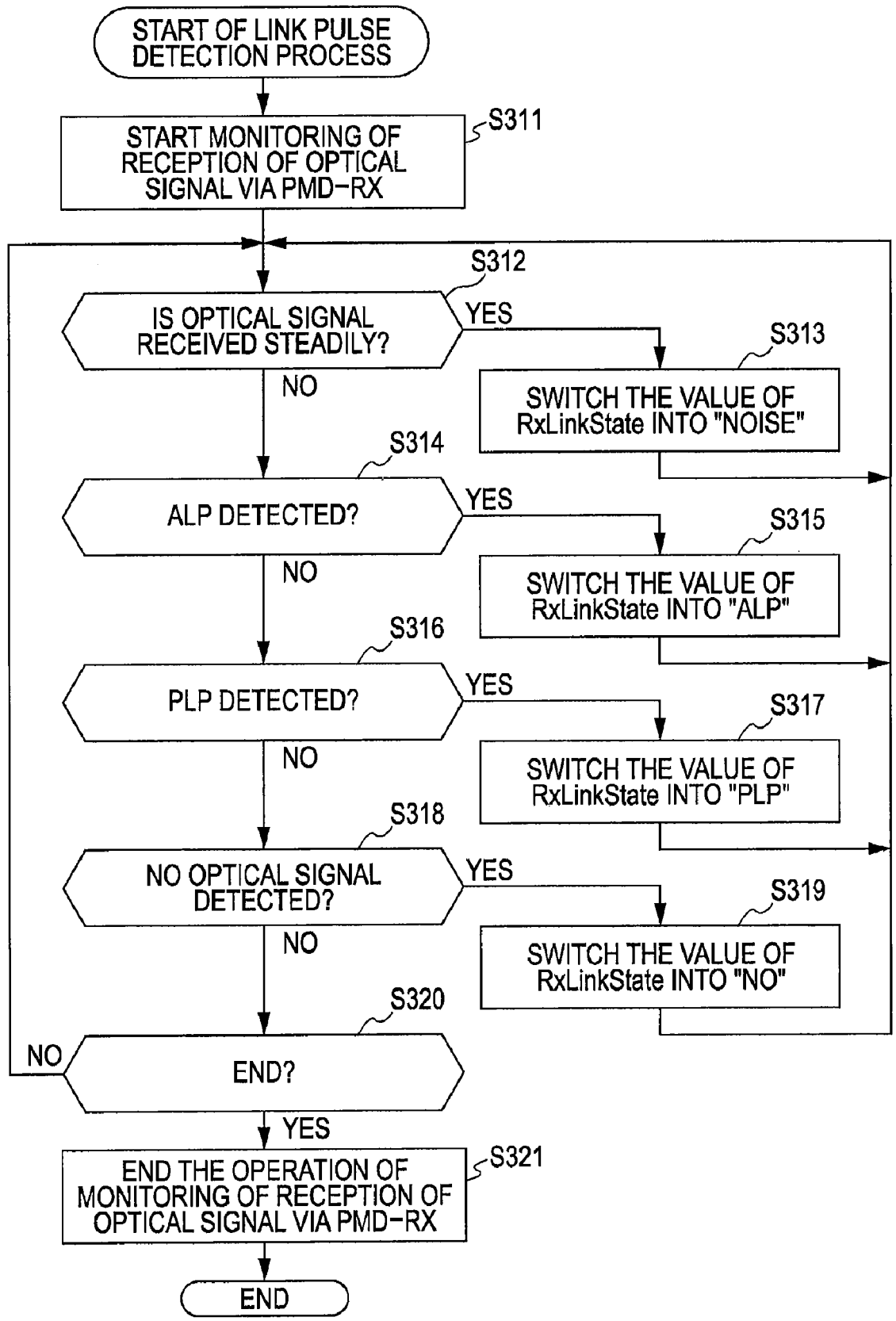
FIG. 13 is a flow chart showing an example of a process of detecting a link pulse signal.

The receiving unit may be an optical receiver (for example, a PMD-RX shown in FIG. 1) adapted to receive an optical signal, and the state notification detection means detects a state notification on the basis of a turning on/off pattern of the optical signal received by the receiving unit (for example, in steps S314 and 5316 in FIG. 13).

Figure 14:
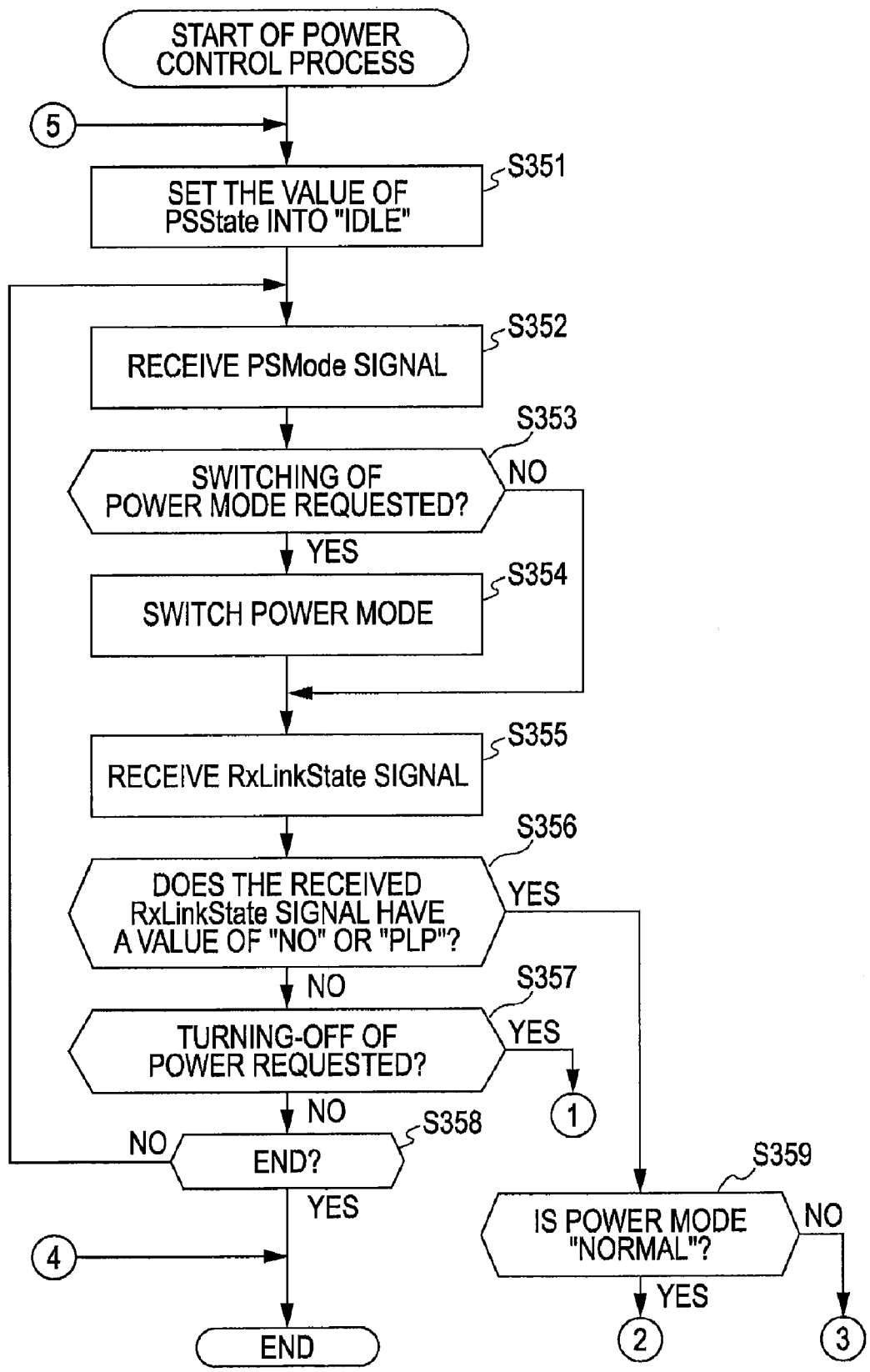
FIG. 14 is a flow chart showing a part of an example of a power control process.
Figure 15:
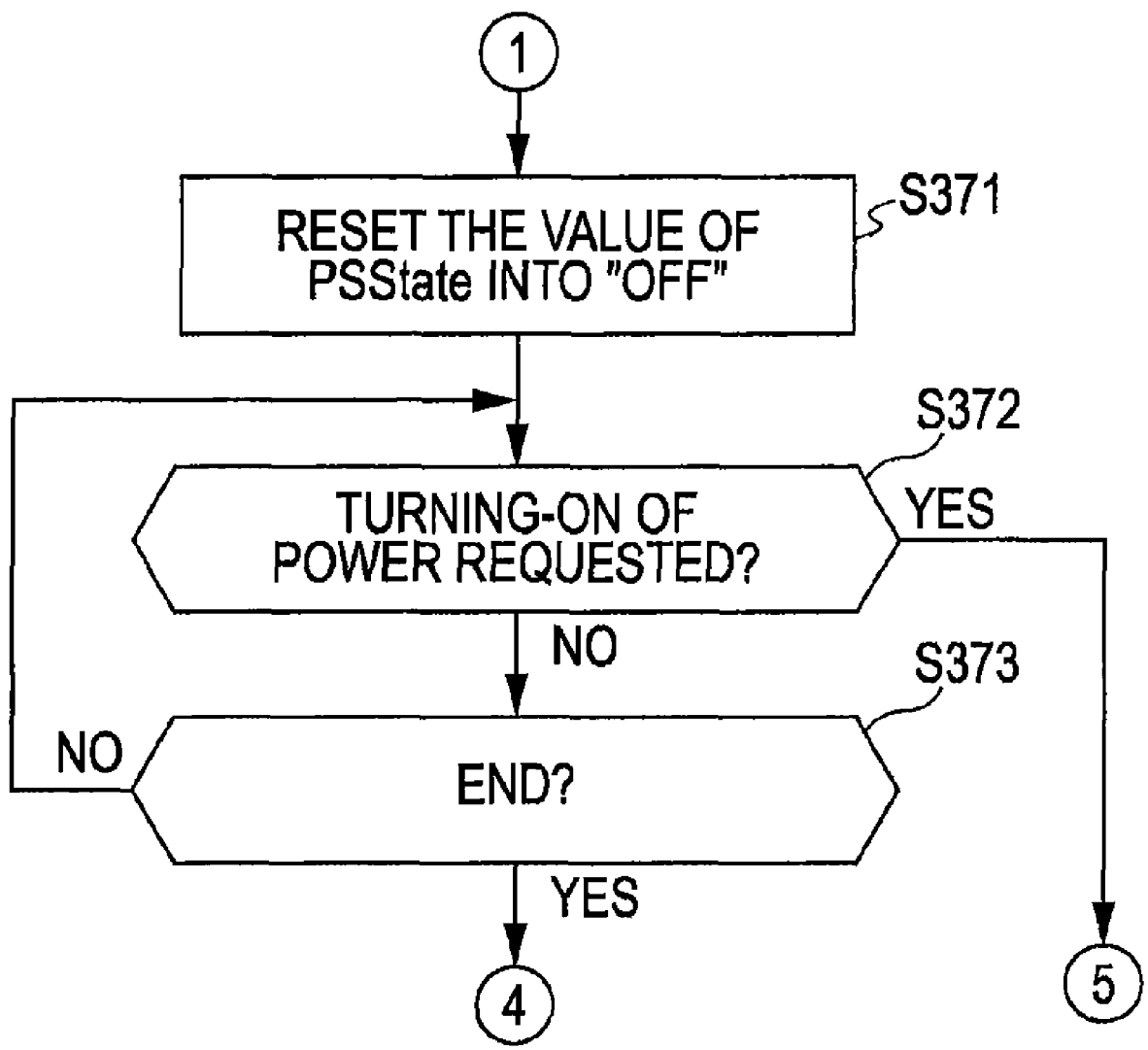
FIG. 15 is a flow chart showing a part of the example of the power control process following the part shown in FIG.
Figure 16:
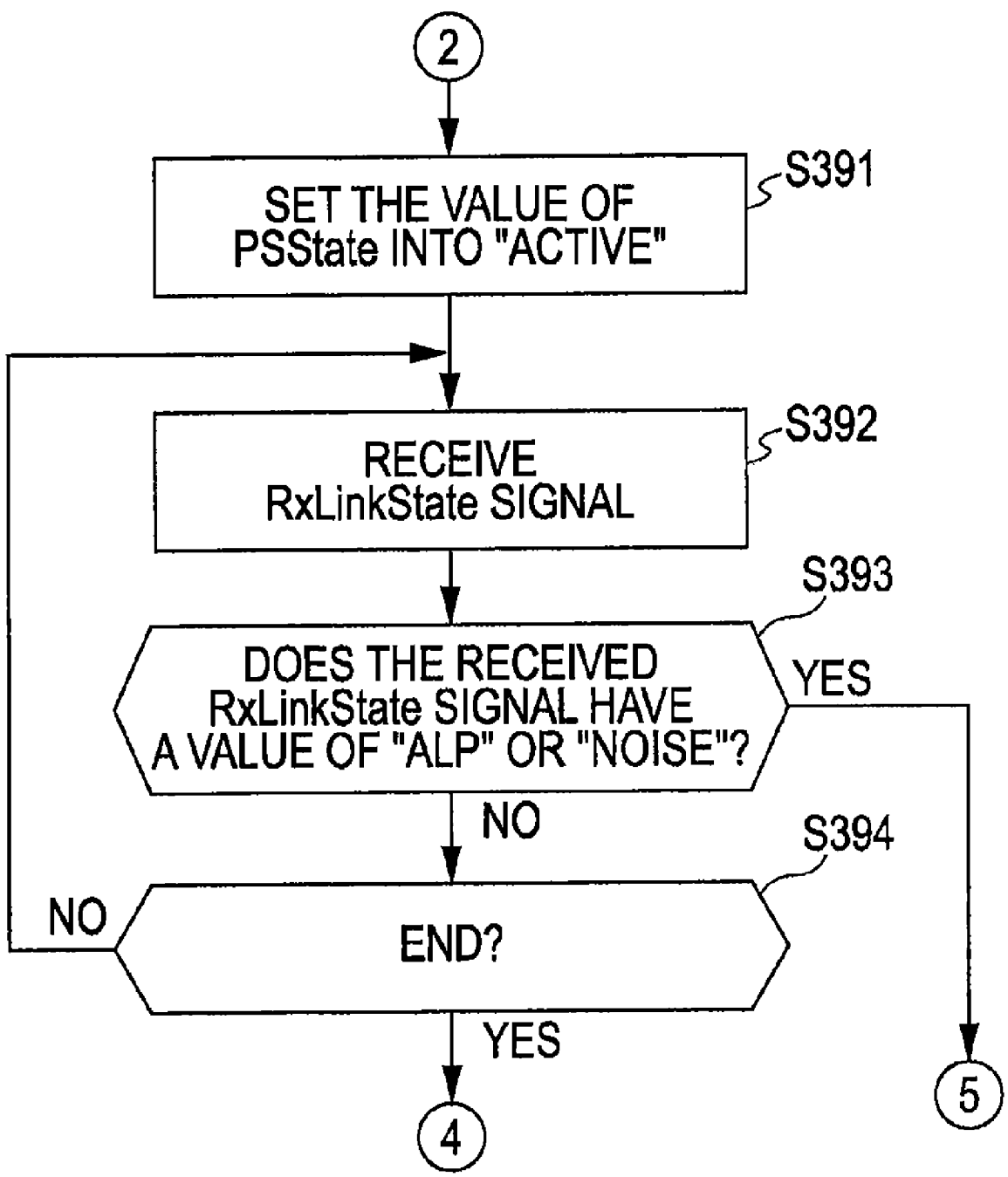
FIG. 16 is a flow chart showing a part of the example of the power control process following the part shown in FIG.
Figure 17:
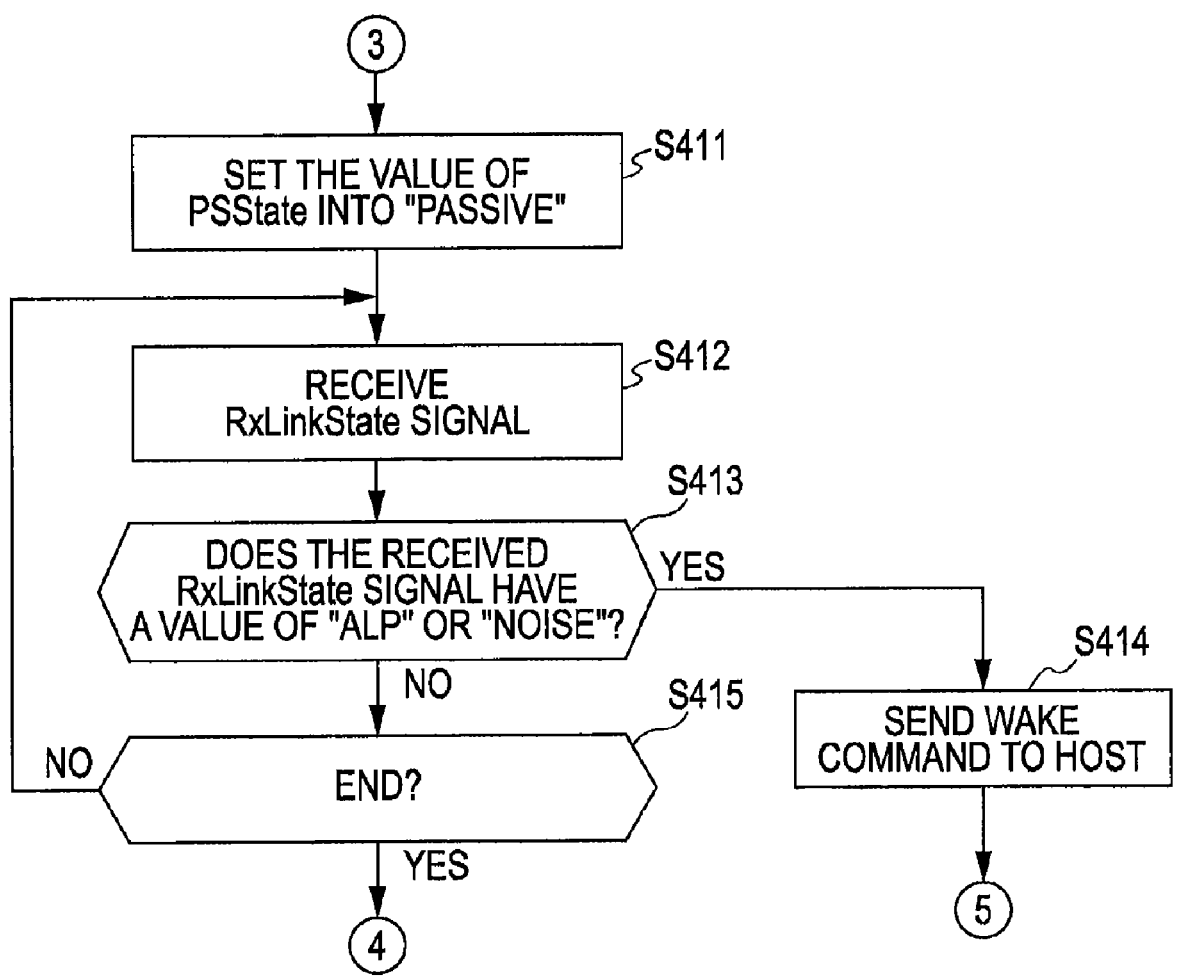
FIG. 17 a flow chart showing a part of the example of the power control process following the part shown in FIG.

According to an embodiment, there is provided a method/program for communication by a communication apparatus (a network interface shown in FIG. 1) comprising a transmission unit (a PMD-TX shown in FIG. 1) adapted to transmit data via a network (for example, an optical cable shown in FIG. 1), a receiving unit (a PMD-RX shown in FIG. 1) adapted to receive data supplied via the network, and an interface unit (an interface unit shown in FIG. 1) adapted to supply to-be-transmitted data to the transmission unit and extract particular information from data received by the receiving unit, the method/program comprising the step (for example, step 5351 in FIG. 14, step S371 in FIG. 15, step 5391 in FIG. 16, or step 5411 in FIG. 17) of controlling an operation state of the interface unit (for example, in step S351 in FIG. 14, step 5371 in FIG. 15, step 5391 in FIG. 16 or step 5411 in FIG. 17).

The present disclosure is described in further detail below with reference to specific embodiments in conjunction with the accompanying drawings.

Figure 1:
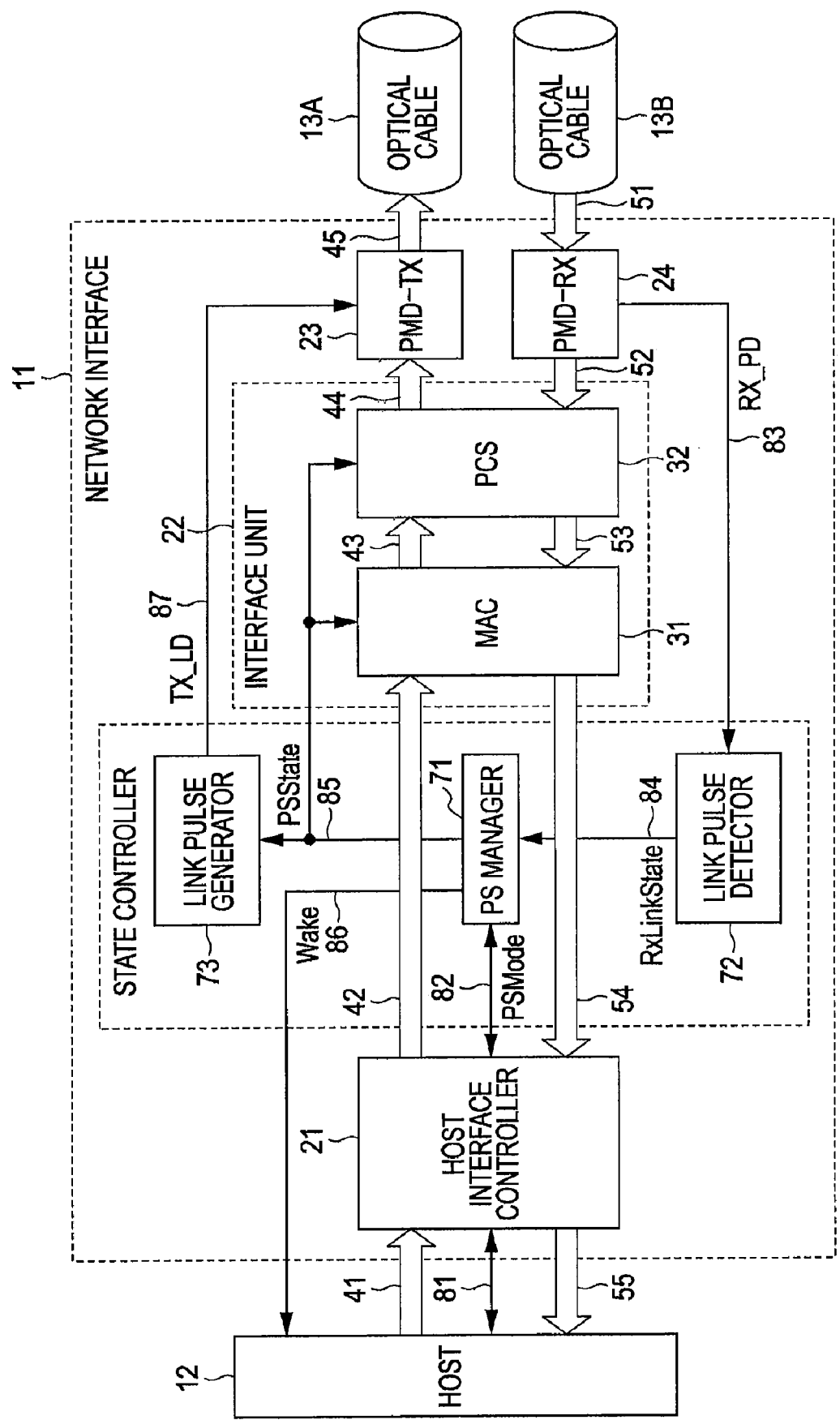
FIG. 1 is a block diagram showing an example of a configuration of a network interface according to an embodiment.

FIG. 1 is a block diagram showing an example of a configuration of a network interface according to an embodiment.

In FIG. 1, a network interface 11 is an apparatus adapted to interface with a network of an information processing apparatus serving as a host 12. More specifically, when the network interface 11 receives information from the host 12, the network interface 11 transmits the received information over an optical cable 13A which is part of the network. Conversely, when the network interface 11 receives information coming via an optical cable 13B, the network interface 11 transfers the received information to the host 12.

The host 12 is, for example, an information processing apparatus such as a personal computer capable of communicating with another apparatus via a network (the optical cable 13A and the optical cable 13B) using an upper-level protocol of the OSI (Open Systems Interconnection) reference model.

The optical cable 13A and the optical cable 13B are transmission lines adapted to transmit an optical signal and they are part of the network that connects the network interface 11 to another communication apparatus (not shown). The optical cable 13A transmits a signal output from the network interface 11 to a communication apparatus (not shown), while the optical cable 13B transmits a signal output from a communication apparatus (not shown) to the network interface 11. Hereinafter, a generic expression "optical cable 13" will be used when it is not necessary to distinguish the optical cable 13A and the optical cable 13B from each other or this expression will be used to describe both the optical cable 13A and the optical cable 13B.

The network interface 11 performs an interfacing process including a process associated with a physical layer and a data layer at a communication speed up to 10 Ggps in accordance with the Ethernet® standard based on the standard IEEE802.3ae established by IEEE (Institute of Electrical and Electronic Engineers). More specifically, for example, the network interface 11 generates a MAC (Media Access Control) frame from an IP packet supplied from the host 12, performs encoding and serial conversion on the generated MAC frame, converts the resultant data into an optical signal, and transmits it over the optical cable 13A When the network interface 11 receives an optical signal supplied via the optical cable 13B, the network interface 11, the network interface 11 converts the received optical signal into electronic information, converts the electronic information into a parallel form, and decodes it into a MAC frame. Furthermore, the network interface 11 extracts an IP packet from the MAC frame and supplies it to the host 12.

Although in the example shown in FIG. 1, the network interface 11 and the host 12 are provided separately, they may be installed in a single apparatus as long as the overall configuration similar to that shown in FIG. 1 is achieved. For example, the network interface 11 may be provided in the form of an expansion card or the like and may be removably connected to a particular interface of the host 12.

The network interface 11 includes a host interface controller 21, an interface unit 22, a PMD-TX (Physical Medium Dependent-TX) 23, a PMD-RX ((Physical Medium Dependent-RX) 24, buses 41 to 45, and buses 51 to 55.

The host interface controller 21 is a block directly connected to the buses (the buses 41, 55, and 81) connected to the host 12. These buses may be realized by buses according to a widely used standard such as PCI Express buses or by buses based on a special dedicated architecture. The host interface controller 21 controls the network interface 11 in accordance with an operation command supplied from the host 12 via the bus 81. More specifically, the host interface controller 21 includes therein control registers whose values are controlled by the host 12, and the host interface controller 21 controls the operation of each block in the network interface 11 in accordance with the values of the control registers.

If the host interface controller 21 receives a data transmission command from the host 12, the host interface controller 21 accesses the host 12 via the bus 41 to acquire to-be-transmitted data (in the form of an IP (Internet Protocol) packet) and transfers the acquired to-be-transmitted data to the interface unit 22 via the bus 42. Furthermore, if the host interface controller 21 acquires, via the bus 54, the received data (IP packet) from the network interface 11, the host interface controller 21 transfers it to the host 12 via the bus 55. The host interface controller 21 also performs an interrupt process associated with data transmission/reception to/from the host 12. More specifically, for example, the host interface controller 21 informs the host 12 of completion of transmission/reception of data.

The interface unit 22 includes an MAC frame generator 31 and a PCS (Physical Coding Sublayer) 32 serving as a frame encoder.

The MAC frame generator 31 is a unit adapted to control media access. More specifically, if the MAC frame generator 31 receives, via the bus 42, data (IP packet) to be transmitted, the MAC frame generator 31 shapes the received data into the form of a MAC frame and transfers it to PCS 32 via the bus 43. In the network interface 11, if the MAC frame generator 31 acquires received data (a MAC frame) via the bus 53, the MAC frame generator 31 analyzes the received data to extract an IP packet and transfers the extracted IP packet to the host interface controller 21 via the bus 54.

The PCS 32 performs block-encoding on the varying-length MAC frame supplied from the MAC frame generator 31 via the bus 43. More specifically, the PCS 32 converts each 4-bit data in the MAC frame into a 5-bit codeword (bit pattern). The PCS 32 converts the encoded data to be transmitted into a serial form (PMA (Physical Medium Attachment)) and supplies the resultant serial data to the PMD-TX 23 via the bus 44. In the network interface 11, if the PCS 32 acquires received data (in the form of serial data) via the bus 52, the PCS 32 converts it into a parallel form and decodes it into a MAC frame. The PCS 32 supplies the resultant MAC frame to the MAC frame generator 31 via the bus 53.

The PMD-TX 23 outputs an optical signal over the optical cable 13A connected to the network interface 11 via the bus 45. More specifically, if the PMD-TX 23 receives via the bus 44 data (serial data) to be transmitted, the PMD-TX 23 transmits it as an optical signal over the optical cable 13A.

If the PMD-RX 24 receives, via the bus 51, an optical signal coming through the optical cable 13B connected to the network interface 11, the PMD-RX 24 converts the received optical signal into the form of an electrical signal and transfers the resultant electrical signal to the PCS 32 via the bus 52.

Thus, data transmitted from the host 12 is sequentially passed through the bus 41, the host interface controller 21, the bus 42, the MAC frame generator 31, the bus 43, the PCS 32, the bus 44, the PMD-TX 23, and the bus 45, and finally transmitted over the optical cable 13A. On the other hand, an optical signal coming through the optical cable 13B is received by the PMD-RX 24 via the bus 51. The data acquired from the received optical signal is further sequentially passed through the bus 52, the PCS 32, the bus 53, the MAC frame generator 31, the bus 54, the host interface controller 21, and the bus 55, and is finally transferred to the host 12.

The network interface 11 further includes a state controller 61 adapted to control the operation state of the network interface 11.

For example, the network interface 11 can be in one of the following states: an active state (an on-state) in which necessary electric power is supplied to the network interface 11 and a normal operation is performed, an inactive state (an off-state) in which no electric power is supplied and no operation is performed, and a sleep state (a standby state) in which minimum electric power is supplied but normal operation is not performed. Note that the allowable states are not limited to those described above. For example, the allowable states may include additional states such as a state in which the normal operation is partially limited, and/or a state in which the operation is performed at a higher or lower speed than the normal operating speed.

The state controller 61 controls the operation state of each part of the network interface 11 in accordance with the command issued by the host 12 and/or the state of another communication apparatus connected to the network interface 11. More specifically, as required, the network interface 11 puts one or more parts thereof into the sleep state or the off-state to minimize the unnecessary power consumption.

In the sleep state, at least part or all of the normal activity is stopped and a smaller amount of electric power is supplied than in the active state so that the power consumption is reduced. The sleep state and the inactive state are generally set to be different from each other, although they may be set to be equal to each other. In general, transition from the sleep state to the active state in which power is turned on needs a smaller number of processing steps and a shorter processing time than transition from the inactive state in which power is turned off to the active state in which power is turned on.

The sleep state or the inactive state may be set to be different depending on parts. For example, the sleep state of the host 12 may be set such that basically all functions are stopped but it is possible to return to the active state in response to a predetermined wake signal supplied from the outside. On the other hand, the sleep state of the network interface 11 may be set such that the functions of the interface unit 22 are stopped.

The state controller 61 is capable of controlling the operation state depending on a received notification of the state of another communication apparatus. More specifically, the state controller 61 optimally controls various parts of the network interface 11 depending on the operation state. For example, the state controller 61 puts the interface unit 22 into the sleep state only when no communication is performed. The state controller 61 may notify another apparatus of the operation state of the network interface 11. This makes it possible for the state controller 61 and an apparatus connected to the network interface 11 for communication to exchange information indicating the operation state thereof, which allows it to control the operation state in a more proper manner. To send a notification of the operation state, the state controller 61 turns on and off a signal light (that is, the state controller 61 sends a link pulse signal) with a small duty ratio, which allows a further reduction in power consumption.

The state controller 61 includes a PS (Power Save) manager 71, a link pulse detector 72, and a link pulse generator 73.

The PS manager 71 is a processing unit adapted to control the state of each part of the network interface 11. If the host interface controller 21 receives a command or information from the host 12 via the bus 81, the host interface controller 21 transfers the received command or information to the PS manager 71 via the bus 82. Thus, the PS manager 71 acquires and holds the command or information. More specifically, for example, the PS manager 71 acquires PS mode information (PSMode) indicating the power state of the host 12 or control information from the host interface controller 21 via the bus 82 and stores the acquired information.

The PS manager 71 includes therein a state machine for controlling power management. More specifically, the PS manager 71 outputs power control state information (PSState) indicating the current state of the state machine via the bus 85 thereby controlling the operations of the MAC frame generator 31 and the PCS 32 in the interface unit 22 and the link pulse generator 73. Furthermore, as required, the PS manager 71 outputs a wake signal (WAKE) to the host 12 via the bus 86 to wake up the host 12 in the sleep state. As for the wake signal for the above purpose, for example, a WAKE signal according to the PCI Express standard may be used.

If the PS manager 71 acquires received link pulse state information (RxLinkState) from the link pulse detector 72 via the bus 84, the PS manager 71 updates the current state of the state machine in accordance with the received link pulse state information (RxLinkState) and a command issued by the host 12. As described above, the change in the state of the state machine causes the output value of the power control state information (PSState) to change. More specifically, in accordance with the received link pulse state information (RxLinkState) and/or a command issued by the host 12, the PS manager 71 controls the operation state of the interface unit 22, the outputting of a signal from the link pulse generator 73, and/or activating of the host 12.

The link pulse detector 72 detects an operation state notification supplied from another communication apparatus (another network interface or host) to which the network interface 11 is connected via the optical cable 13 and with which the network interface 11 (the host 12) is communicating. If the link pulse detector 72 detects an operation state notification, it supplies information indicating the state as received link pulse state information (RxLinkState) to the PS manager 71 via the bus 84.

The communication apparatus, being in connection with the network interface 11 for communication, notifies the network interface 11 of the operation state of the communication apparatus by turning on signal light, turning off signal light, or turning on and off signal light in a particular pattern (as a link pulse signal) and sending the resultant signal light to the network interface 11 via the optical cable 13B. If the PMD-RX 24 receives the optical signal coming via the optical cable 13B, the PMD-RX 24 performs the above-described process on the received optical signal and supplies a detection result (RX_PD) of the signal light (the received light) to the link pulse detector 72 via the bus 83. The information indicating the detection result (RX PD) may be expressed in any proper form. For example, in the case where no received light is detected for a predetermined period of time or in the case where received light is continuously detected over a predetermined period of time, the detected fact is notified as the detection result (RX PD) information. In the case where the detected light is turning on and off, the turning-on/off pattern of the light may be notified as the detection result information (RXPD).

The link pulse detector 72 detects a link pulse signal (signal light with a particular turning-on/off pattern transmitted from another communication apparatus) indicating a state of this another communication apparatus from the received light (RX_PD), and the link pulse detector 72 supplies a detected result as received link pulse state information (RxLinkState) to the PS manager 71. Via the above-described process by the link pulse detector 72, the PS manager 71 controls the various parts of the network interface 11 and/or activates the host 12 depending on the operation state of the another apparatus with which the network interface 11 is connected for communication. More specifically, for example, the PS manager 71 puts the interface unit 22 into the sleep state to reduce the power consumption thereof only when the information detected by the link pulse detector 72 indicates that no communication is being performed with the another apparatus being in connection with the network interface 11 for communication, thereby achieving better control of power consumption.

The link pulse generator 73 supplies, to the PMD-TX 23 via the bus 87, a control signal (TX_LD) to control turning on/off of signal light output by the PMD-TX 23 in accordance with the power control state information (PSState) output by the PS manager 71. That is, the link pulse generator 73 controls the PMD-TX 23 by using the control signal (TXLD) to output information, as a link pulse signal of signal light turning on and off, indicating the operation state of the network interface 11 as required. This makes it possible for the link pulse generator 73 to notify another communication apparatus connected via the optical cable 13 of the operation state of the network interface 11 thereby making it possible for this another communication apparatus to control the power consumption in a more proper manner depending on the operation state of the network interface 11. When the link pulse signal is output by turning on and off the signal light from the PMD-TX 23, the link pulse generator 73 can reduce the power consumption by reducing the duty ratio of the signal light.

Figure 2:
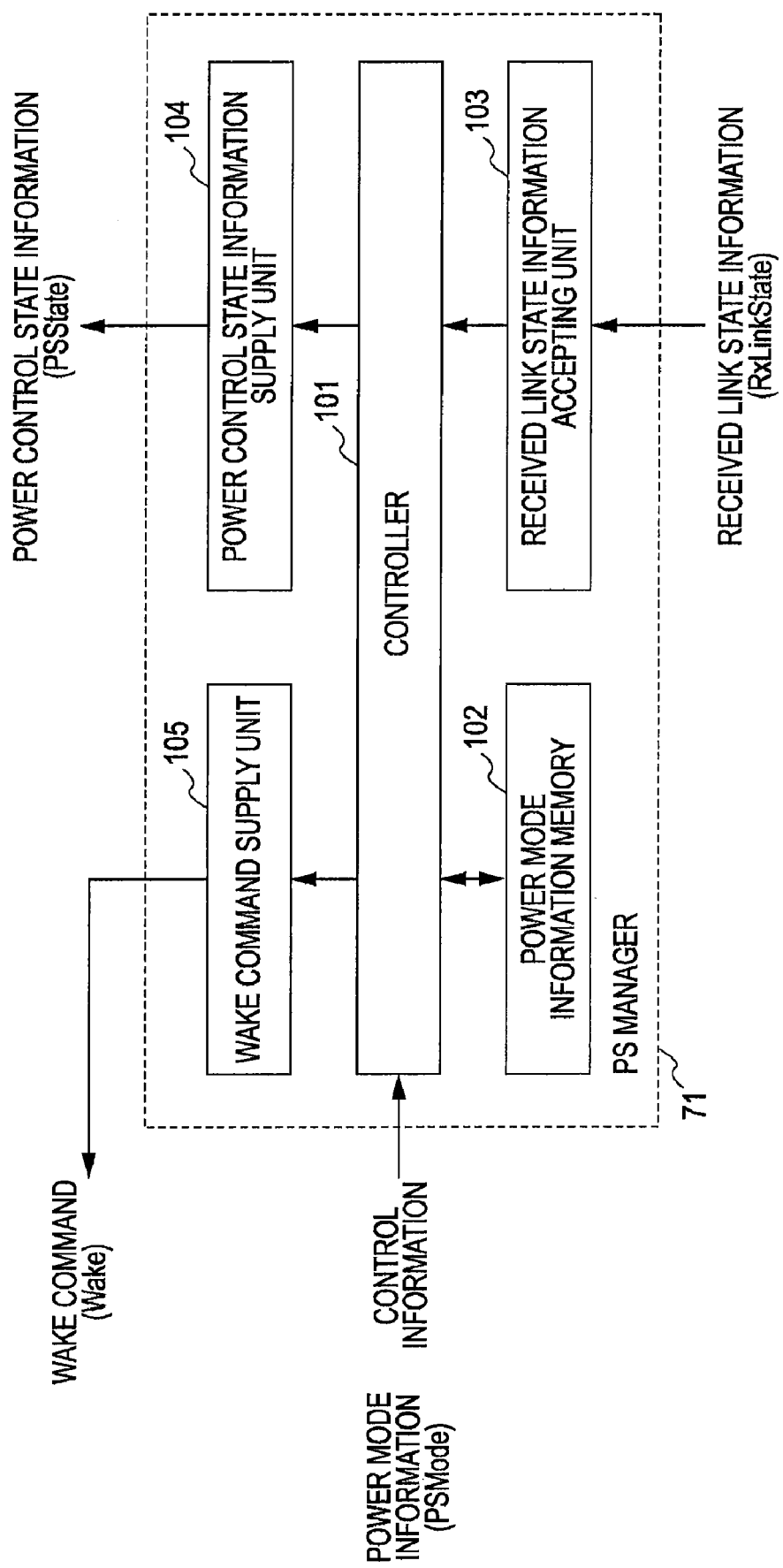
FIG. 2 is a block diagram showing an example of a detailed configuration of a PS manager shown in FIG. 1.

FIG. 2 is a block diagram showing an example of a detailed configuration of the PS manager 71 shown in FIG. 1.

The PS manager 71 includes a controller 101, a PS mode information storing unit 102, a received link pulse state information accepting unit 103, a power control state information supply unit 104, and a wake command supply unit 105.

The controller 101 controls various parts of the PS manager 71. More specifically, if the controller 101 acquires PS mode information (PSMode) via the bus 82, the controller 101 supplies it to the PS mode information storing unit 102 to store it therein. If the controller 101 receives control information from the host 12 via the bus 82 or acquires received link state information (RxLinkState) accepted by the receiving link state information accepting unit 103, then, according to the received information or the PS mode information (PSMode) stored in the PS mode information storing unit 102, the controller 101 updates the state of the power control state information supply unit 104 or controls the wake command supply unit 105 to output the wake command (WAKE) to the host 12.

The PS mode information storing unit 102 includes a storage area realized by a semiconductor memory such as a RAM (Random Access Memory) or a flash memory, and the PS mode information storing unit 102 stores PS mode information (PSMode) in the storage area so as to be capable of supplying the PS mode information (PSMode) to the controller 101 as required.

The PS mode information (PSMode) is information indicating the power state of the host 12, and PS modes may include, for example, the following two modes: a normal mode in which the host 12 is active and it performs a normal operation; and a WOL (Wake On LAN) mode in which the host 12 is in the sleep state and the host 12 is waiting for a wake command (WAKE signal) to be issued by the PS manager 71. Note that the PS modes are not limited to those described above, and the PS modes may include three or more modes.

If the PS mode information storing unit 102 receives PS mode information (PSMode) from the controller 101, the PS mode information storing unit 102 updates the value of the PS mode information (PSMode) stored therein in accordance with the received PS mode information (PSMode). In accordance with a request from the controller 101, the PS mode information storing unit 102 supplies the PS mode information (PSMode) stored therein to the controller 101.

The received link pulse state information accepting unit 103 accepts received link pulse state information (RxLinkState) supplied from the link pulse detector 72 via the bus 84, and the received link pulse state information accepting unit 103 transfers the accepted received link pulse state information (RxLinkState) to the controller 101. In accordance with the accepted received link pulse state information (RxLinkState), the controller 101 properly controls the operation state depending on the status of another communication apparatus being in communication.

Under the control of the controller 101, the power control state information supply unit 104 manages the status information indicating the operation state of the network interface 11, and, in accordance with the status information, supplies power control state information (PSState), which is state setting information for setting the operation state of the network interface 11, to the MAC frame generator 31, the PCS 32, and the link pulse generator 73. That is, the controller 101 controls the power control state information supply unit 104 thereby controlling the operation state of the MAC frame generator 31, the PCS 32, and the link pulse generator 73.

Under the control of controller 101, the wake command supply unit 105 supplies a wake command (WAKE) to the host 12 via the bus 86 to wake up the host 12 in the sleep state. That is, the controller 101 controls the wake command supply unit 105 thereby waking up the host 12 from the sleep state.

Figure 3:
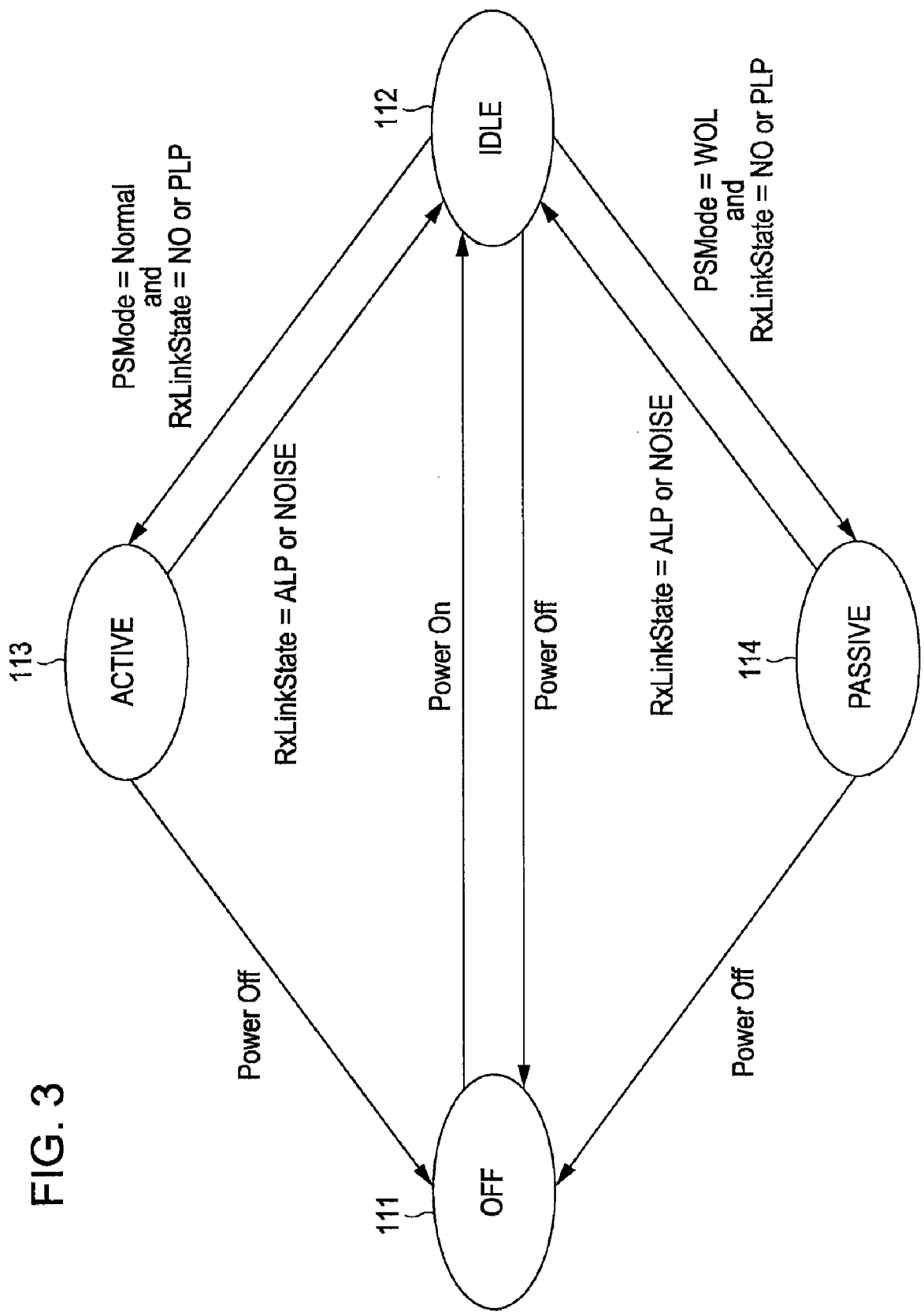
FIG. 3 is a diagram showing an example of a manner in which a power control state is switched by a PS manager.

In the power control, the PS manager 71 sets the network interface 11 in one of four states such as those shown in FIG. 3 in accordance with the PS mode information (PSMode) and the received link pulse state information (RxLinkState).

FIG. 3 is a diagram showing an example of a manner in which a power control state is switched by the PS manager.

The PS manager 71 defines four states, that is, an off-state (OFF) 111, an idle state (IDLE) 112, an active state (ACTIVE) 113, and a passive state (PASSIVE) 114, and the PS manager 71 controls transition among these four states.

The off-state (OFF) 111 is a state in which the power of the network interface 11 is turned off and the operation thereof is stopped. In this state, the PMD-TX 23 stops outputting of the signal light. The idle state (IDLE) 112 is a state in which the power of the network interface 11 is turned on and the network interface 11 can transmit and receive information. In this state, the PMD-TX 23 outputs signal light over the optical cable 13A.

The active state (ACTIVE) 113 is a state in which when the PS mode information (PSMode) indicates the normal mode (the host 12 is active), the interface unit 22 is put into the sleep state. In this state, under the control of the link pulse generator 73 (in accordance with the control signal (TXLD)), the PMD-TX 23 outputs an active link pulse signal (ALP) being turned on and off the signal light in a particular pattern over the optical cable 13A to notify that the network interface 11 is in the active state (ACTIVE) 113. The details of the active link pulse signal (ALP) will be described later.

The passive state (PASSIVE) 114 is a state in which when the PS mode information (PSMode) indicates the WOL mode (in which the host 12 is in the sleep state), the interface unit 22 is put into the sleep state. In this state, the PMD-TX 23 turns on and off signal light under the control of the link pulse generator 73) (in accordance with the control signal (TXLD)) and the PMD-TX 23 outputs the resultant signal light as the passive link pulse signal (PLP) with a particular on/off pattern over the optical cable 13A thereby notifying that the network interface 11 is in the passive state (PASSIVE) 114. The details of the passive link pulse signal (PLP) will be described later.

For example, if power of the host 12 is turned on when the network interface 11 is in the off-state (OFF) 111, the turning-on of the host 12 causes the network interface 11 to be turned on (Power On), and the PS manager 71 changes the status into the idle state (IDLE) 112.

When the status is in the idle state (IDLE) 112, if a NO state message indicating that the PMD-RX 24 is detecting no signal light or a PLP state message indicating that a passive link pulse signal has been detected is received as received link pulse state information from the link pulse detector 72 (RxLinkState=NO or PLP), the PS manager 71 changes the status into the active state (ACTIVE) 113 if the PS mode information indicates the normal mode (PSMode=Normal) or into the passive state (PASSIVE) 114 if the PS mode information indicates the WOL mode (PSMode=WOL).

On the other hand, when the status is in the active state (ACTIVE) 113 or the passive state (PASSIVE) 114, if an ALP state message indicating that an active link pulse signal has been detected or a NOISE state message indicating that the PMD-RX 24 has detected signal light continuously over a predetermined period of time is received as received link pulse state information from the link pulse detector 72 (RxLinkState=ALP or NOISE), the PS manager 71 changes the status into the idle state (IDLE) 112.

If the power of the host 12 is turned off when the state is in the idle state (IDLE) 112, the active state (ACTIVE) 113, or the passive state (PASSIVE) 114, the turning-off of the host 12 causes the network interface 11 to be turned off (Power Off), and the PS manager 71 changes the status into the off-state (OFF) 111.

That is, when the received link pulse state information has a value of "NO" or "PLP", that is, when an apparatus being in connection or to be connected with the network interface 11 for communication is in a disconnected state, an off-state, or a passive state (in which both the host and the network interface are in the sleep state), and thus the probability of occurrence of communication is low, the PS manager 71 changes the status of the network interface 11 into the active state (ACTIVE) 113 or the passive state (PASSIVE) 114, in which the operation of the interface unit 22 is stopped and a link pulse signal is output from the PMD-TX 23, thereby reducing the power consumption of the network interface 11.

When the host 12 is active, the network interface 11 is capable of transmitting/receiving data to/from an apparatus being in connection with the network interface 11 for the purpose of communication, if this connected apparatus is in a state in which communication is possible. Thus, in this case, it is desirable to put the connected apparatus into the state in which communication is possible. To this end, the PS manager 71 changes the status into an active state (ACTIVE) 113 in which an active link pulse signal (ALP) is transmitted to the connected apparatus to cause the status of the connected apparatus to be changed into the state in which data transmission/reception is possible.

On the other hand, when the host 12 is in the sleep state, the network interface 11 is not capable of communicating with an apparatus being in connection with the network interface 11 for communication even if the apparatus is in the state in which communication is possible. Thus, in this case, it is desirable to put the connected apparatus into the sleep state. To this end, the PS manager 71 changes the status into the passive state (PASSIVE) 114 in which a passive link pulse signal (PLP) is transmitted to the apparatus connected for communication thereby causing the status of the connected apparatus to be changed into the sleep state.

As described above, when the network interface 11 is in the sleep state, the PS manager 71 sets the network interface 11 into one of two sub-states, that is the active state (ACTIVE) 113 or the passive state (PASSIVE) 114, depending on the situation. That is, the exchange of information on the operation state of the network interface 11 and that of the apparatus with which the network interface 11 is connected for communication makes it possible to optimally control the power consumption.

As described above, when the status is in the active state (ACTIVE) 113, the link pulse generator 73 outputs an active link pulse signal (ALP) via the PMD-TX 23, while the link pulse generator 73 outputs a passive link pulse signal (PLP) via the PMD-TX 23 when the status is in the passive state (PASSIVE) 114.

Figure 4:
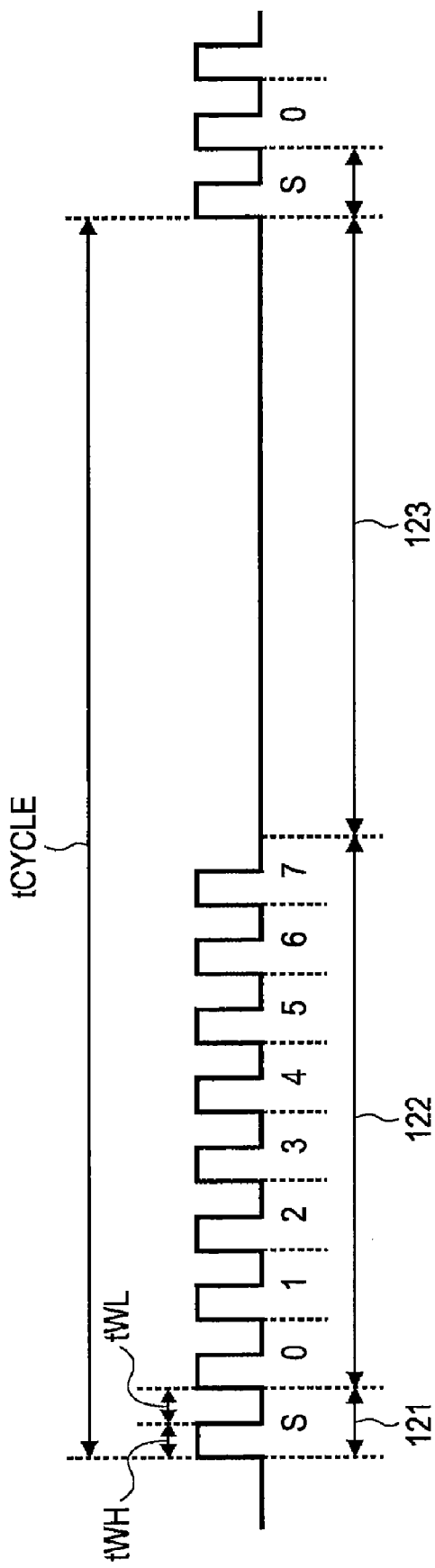
FIG. 4 is a diagram showing an example of a format of a link pulse signal.

FIG. 4 is a diagram showing an example of a format of a link pulse signal. As shown in FIG. 4, in each cycle (tCYCLE), the link pulse signal has a start pulse output period 121 during which a start pulse (S) is output, an 8-pulse output period 122 with a length that allows eight pulses to be output, and a no-signal period 123. Note that the start pulse (S) output in the start pulse output period 121 and eight pulses (pulses 0 to 7) output in the 8-pulse output period 122 have the same length (tWH) for a "High" period and the same length (tWL) for a "Low" period (that is, the duty ratio is the same for all these pulses): The PMDTX 23 outputs the link pulse signal in the above-described format by turning on and off the signal light.

The link pulse signal can be an active link pulse signal (ALP) or a passive link pulse signal (PLP) depending on the pattern of pulses output during the 8-pulse output period 122.

Figure 5:
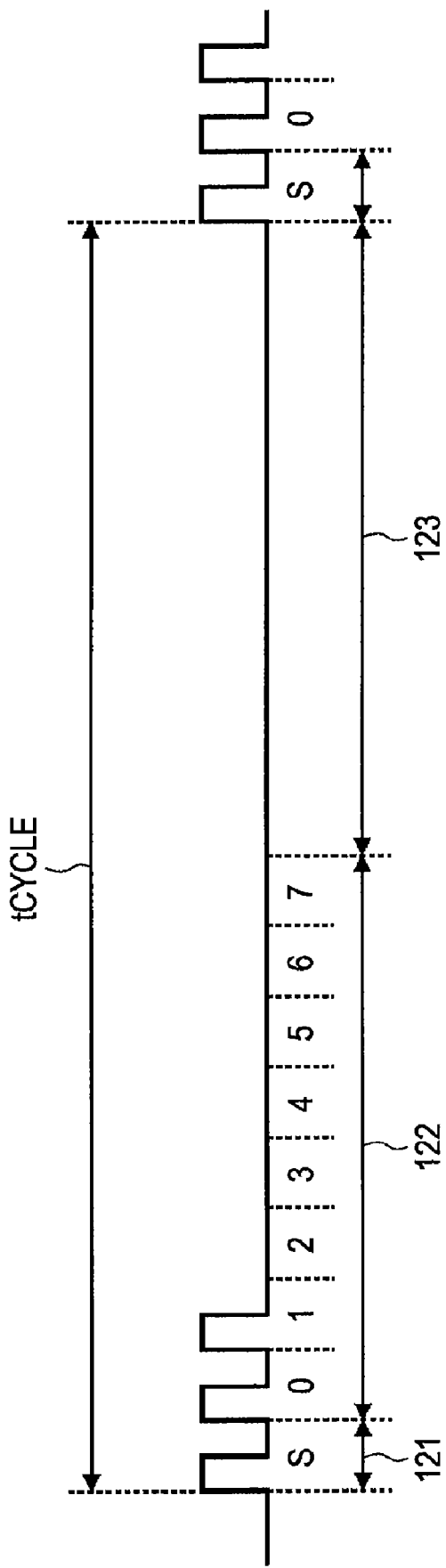
FIG. 5 is a diagram showing an example of an active link pulse signal.

FIG. 5 is a diagram showing an example of an active link pulse signal. In the example of the active link pulse signal shown in FIG. 5, after the start pulse (S), only first two pulses (a pulse 0 and a pulse 1) are output in the 8-pulse output period 122 and the remaining six pulses (pulses 2 to 7) are not output (that is, these six pulses have a value of "Low").

Figure 6:
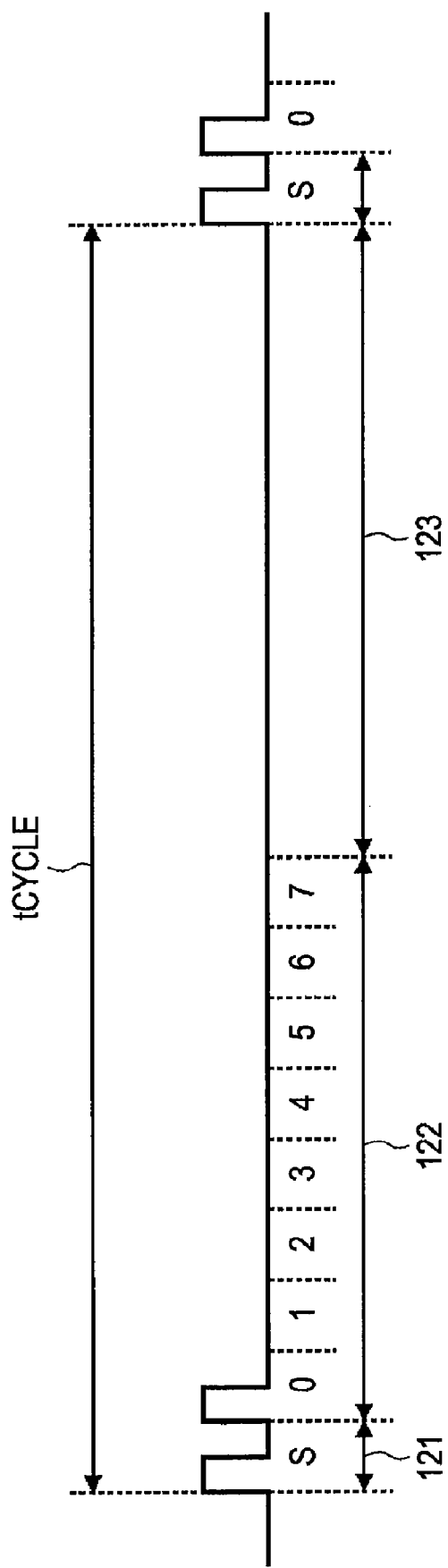
FIG. 6 is a diagram showing an example of a passive link pulse signal.

FIG. 6 is a diagram showing an example of a passive link pulse signal. In the example of the passive link pulse signal shown in FIG. 6, only the first pulse (the pulse 0) is output in the 8-pulse output period 122 after the start pulse (S), but the remaining seven pulses (the pulses 1 to 7) are not output (that is, these seven pulses have a value of "Low").

As shown in FIGS. 5 and 6, the active link pulse signal (ALP) and the passive link pulse signal (PLP) are different from each other in terms of the pulse pattern in the 8-pulse output period 122. Thus, the link pulse detector 72 can easily determine whether the link pulse signal is the active link pulse signal (ALP) or the passive link pulse signal (PLP) on the basis of the pulse pattern in the 8-pulse output period 122.

Note that pulse patterns in the 8-pulse output period 122 of the link pulse signal are not limited to those described above with reference to FIGS. 5 and 6, but the link pulses may have different patterns as long as they can be distinguished from each other. Also note that the format of the link pulse signal is not limited to that shown in FIG. 4.

FIG. 7 is a flow chart showing an example of processing flow in which a state transition occurs from the off-state (OFF) 111 to the idle state (IDLE) 112.

When the status is in the off-state (OFF) 111, the respective parts are in the following states. That is, the host 12 is in a power-off state (step S1), the PS manager 71 is in a state in which power control state information (PSState) with a value of "OFF" is output (step S1), the interface unit 22 is in a power-off state (step S21), the link pulse generator 73 is in a power-off state (step S31), and the link pulse detector 72 is in a power-off state (step S41).

In this status, for example, if a user performs an operation to turn on the host 12, then, in step S2, the host 12 turns on its power. In step S3, the host 12 supplies a turn-on command to the PS manager 71, the interface unit 22, the link pulse generator 73, and the link pulse detector 72 thereby turning on the network interface 11. This turn-on command is received by the PS manager 71 in step S12, by the interface unit 22 in step S22, by the link pulse generator 73 in step S32, and by the link pulse detector 72 in step S42.

In step S23, the interface unit 22 turns on the power thereof in accordance with the received turn-on command. In step S33, the link pulse generator 73 turns on the power thereof in accordance with the received turn-on command. In step S43, the link pulse detector 72 turns on the power thereof in accordance with the received turn-on command.

If the PS manager 71 receives the turn-on command from the host 12, then in step S13, the PS manager 71 switches the status into the idle state (IDLE) 112 and supplies power control state information (PSState) having a value of IDLE to the interface unit 22 and the link pulse generator 73.

If the interface unit 22 receives this power control state information (PSState) in step S24, then in step S25, in accordance with the received power control state information (PSState), the interface unit 22 puts the MAC frame generator 31 and the PCS 32 of the interface unit 22 into a state (an active state) in which processing associated with transmission and reception of data is possible.

If the link pulse generator 73 receives the power control state information (PSState) in step S34, then in step S35, in accordance with the received power control state information (PSState), the link pulse generator 73 turns on the PMD-TX 23 to output signal light.

In step S44, after the link pulse detector 72 turned on the power thereof in step S43, the link pulse detector 72 starts monitoring of reception of an optical signal by the PMD-RX 24.

FIG. 8 is a flow chart showing an example of a processing flow in which a state transition occurs from the idle state (IDLE) 112 to the active state (ACTIVE) 113.

When the status is in the idle-state (IDLE) 112, the respective parts are in the following states. That is, the host 12 is in a power-on state (step S51), the PS manager 71 is in a state in which power control state information (PSState) with a value of "IDLE" 112 is output (step S61), the interface unit 22 is in a state (an active state) in which data transmission/reception is possible (step S71), the link pulse generator 73 is in a state in which the PMDTX 23 is in the on-state (step S81), and the link pulse detector 72 is in a state in which reception of an optical signal by the PMD-RX 24 is being monitored (step S91).

In step S92, if the link pulse detector 72 detects that the PMD-RX 24 is in the state in which no optical signal is being received, then in step S93, the link pulse detector 72 switches the received link pulse state information (RxLinkState) so as to have a value of "NO" and sends it to the PS manager 71. In step S62, if the PS manager 71 receives this received link pulse state information (RxLinkState), then in step S63, the PS manager 71 switches the power control state information (PSState) so as to have a value of "ACTIVE" 113 because the PS mode information (PSMode) has a value of "Normal Mode" in this specific case. The PS manager 71 sends the power control state information (PSState) to the interface unit 22 and the link pulse generator 73.

If the interface unit 22 receives the power control state information (PSState) from the PS manager 71 in step S72, then, in step S73, the interface unit 22 changes its state into the sleep state in which no operation is performed to reduce the power consumption. On the other hand, if the link pulse generator 73 receives the power control state information (PSState) from the PS manager 71 in step S82, then, in step S83, the link pulse generator 73 controls the PMD-TX 23 so as to transmit an active link pulse signal (ALP) over the optical cable 13A.

The above transition of the network interface 11 from the idle state (IDEL) 112 to the active state (ACTIVE) 113 causes the state of the apparatus connected for communication to be switched into the idle state (IDEL) 112 while maintaining the sleep state, which allows the network interface 11 to return into the idle state (IDLE) 112. That is, the network interface 11 reduces the power consumption when no communication is performed. In the active state (ACTIVE) 113, the network interface 11 may reduce the duty ratio of the output optical signal of the active link pulse signal to further reduce the power consumption.

FIG. 9 is a flow chart showing an example of a processing flow in which a state transition occurs from the active state (ACTIVE) 113 to the idle state (IDLE) 112.

When the status is in the active state (ACTIVE) 113, the respective parts are in the following states. That is, the host 12 is in a power-on state (step S101), the PS manager 71 is in a state in which power control state information (PSState) with a value of "ACTIVE" is output (step S111), the interface unit 22 is in a state (an active state) in which data transmission/reception is possible (step S121), the link pulse generator 73 is in a state in which the active link pulse signal (ALP) is output from the PMD-TX 23 (step S131), and the link pulse detector 72 is in a state in which reception of an optical signal by the PMD-RX 24 is being monitored (step S141).

If the link pulse detector 72 detects, in step S142, the active link pulse signal (ALP) from the optical signal received by the PMD-RX 24, then, in step S143, the link pulse detector 72 switches the received link pulse state information (RxLinkState) so as to have a value of "ALP", and sends it to the PS manager 71. If the PS manager 71 receives this received link pulse state information (RxLinkState) in step S112, then, in step S113, the PS manager 71 switches the power control state information (PSState) so as to have a value of "IDLE" 112 The PS manager 71 sends the power control state information (PSState) to the interface unit 22 and the link pulse generator 73.

If the interface unit 22 receives the power control state information (PSState) from the PS manager 71 in step S122, then, in step S123 the interface unit 22 goes into the state (active state) in which transmission and reception are possible. On the other hand, if the link pulse generator 73 receives the power control state information (PSState) from the PS manager 71 in step S132, then, in step S133, in accordance with the received power control state information (PSState), the link pulse generator 73 turns on the PMD-TX 23 to output signal light.

FIG. 10 is a flow chart showing an example of a processing flow in which a state transition occurs from the idle state (IDLE) 112 to the passive state (PASSIVE) 114.

When the status is in the idle-state (IDLE) 112, the respective parts are in the following states. That is, the host 12 is in the power-on state (step S151), the PS manager 71 is in the state in which power control state information (PSState) with a value of "IDLE" 112 is output (step S261), the interface unit 22 is in the state (the active state) in which data transmission/reception is possible (step S171), the link pulse generator 73 is in the state in which the PMD-TX 23 is in the on-state (step S181), and the link pulse detector 72 is in the state in which reception of an optical signal by the PMD-RX 24 is being monitored (step S191).

If the host 12 receives a turn-into-sleep-state command issued by a user, then, in step S152, the host 12 supplies PS mode information (PSMode) having a value of "WOL Mode" to the PS manager 71. If the PS manager 71 receives this PS mode information (PSMode) in step 5162, the PS manager 71 updates the PS mode information (PSMode) stored in the PS mode information storing unit 102 so as to have a value of "WOL Mode". Thereafter, in step 5153, the host 12 goes into the sleep state.

In step 5192, if the link pulse detector 72 detects that the PMD-RX 24 is in the state in which no optical signal is being received, then, in step 5193, the link pulse detector 72 switches the received link pulse state information (RxLinkState) so as to have a value of "NO" and sends it to the PS manager 71. In step 5163, if the PS manager 71 receives this received link pulse state information (RxLinkState), then in step 5164, the PS manager 71 switches the power control state information (PSState) so as to have a value of "PASSIVE" 114 because the PS mode information (PSMode) has a value of "WOL Mode" in this specific case. The PS manager 71 sends the power control state information (PSState) to the interface unit 22 and the link pulse generator 73.

If the interface unit 22 receives the power control state information (PSState) from the PS manager 71 in step S172, then, in step 5173, the interface unit 22 goes into the sleep state. On the other hand, if the link pulse generator 73 receives the power control state information (PSState) from the PS manager 71 in step 5182, then, in step S183, the link pulse generator 73 controls the PMD-TX 23 so as to transmit a passive link pulse signal (PLP) over the optical cable 13A.

The above transition of the network interface 11 from the idle state (IDEL) 112 to the passive state (PASSIVE) 114 causes the state of the apparatus connected for communication to be switched into the idle state while maintaining the network interface 11 in the sleep state. That is, the network interface 11 reduces not only power consumption of the network interface 11 but also power consumption of the apparatus connected for communication. In the passive state (PASSIVE) 114, the network interface 11 may reduce the duty ratio of the output optical signal of the passive link pulse signal to further reduce the power consumption.

FIG. 11 is a flow chart showing an example of a processing flow in which a state transition occurs from the passive state (PASSIVE) 114 to the idle state (IDLE) 112.

When the status is in the passive state (PASSIVE) 114, the respective parts are in the following states. That is, the host 12 is in a sleep state (step S201), the PS manager 71 is in a state in which power control state information (PSState) with a value of "PASSIVE" 114 is output (step S211), the interface unit 22 is in a sleep state (standby state) (step S221), the link pulse generator 73 is in a state in which the passive link pulse signal (PLP) is output from the PMD-TX 23 (step S231), and the link pulse detector 72 is in a state in which reception of an optical signal by the PMD-RX 24 is being monitored (step S241).

If the link pulse detector 72 detects, in step 5242, the active link pulse signal (ALP) from the optical signal received by the PMD-RX 24, then, in step 5243, the link pulse detector 72 switches the received link pulse state information (RxLinkState) so as to have a value of "ALP", and sends it to the PS manager 71. If the PS manager 71 receives this received link pulse state information (RxLinkState) in step 5212, then, in step 5213, the PS manager 71 outputs a wake command (WAKE) to the host 12 Thereafter, in step 5214, the PS manager 71 switches the power control state information (PSState) so as to have a value of "IDLE" 112, and the PS manager 71 sends the power control state information (PSState) to the interface unit 22 and the link pulse generator 73.

If the interface unit 22 receives the power control state information (PSState) from the PS manager 71 in step S222, then, in step 5223, the interface unit 22 goes into the state (active state) in which transmission and reception are possible. On the other hand, if the link pulse generator 73 receives the power control state information (PSState) from the PS manager 71 in step 5232, then, in step S233, in accordance with the received the power control state information (PSState), the link pulse generator 73 turns on the PMD-TX 23 to output signal light.

If the host 12 in the sleep state receives the wake command from the PS manager 71 in step 5202, then, in step S203, in response to the received wake command, the host 12 turns on the power thereof (and thus the host 12 goes into the active state). Thereafter, in step 5204, the host 12 supplies PS mode information (PSMode) having a value of "Normal Mode" to the PS manager 71. If the PS manager 71 receives this PS mode information (PSMode) in step 5215, the PS manager 71 updates the PS mode information (PSMode) stored in the PS mode information storing unit 102 so as to have a value of "Normal Mode".

Figure 12:
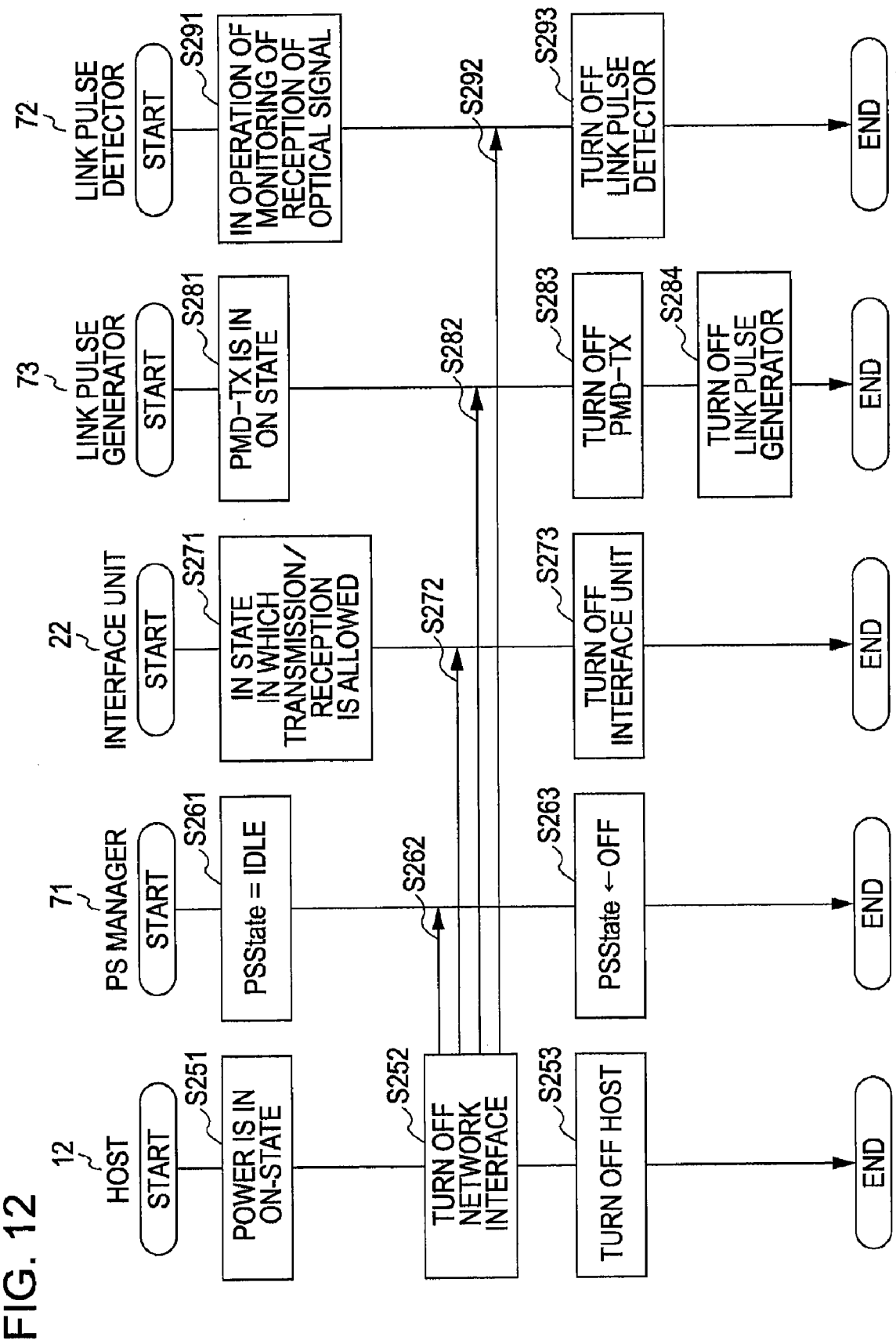
FIG. 12 is a flow chart showing an example of a processing flow in which a state transition occurs from an idle state (IDLE) to an off-state (OFF)

FIG. 12 is a flow chart showing an example of a processing flow in which a state transition occurs from the idle state (IDLE) 112 to the off-state (OFF) 111.

When the status is in the idle-state (IDLE) 112, the respective parts are in the following states. That is, the host 12 is in the power-on state (step S251), the PS manager 71 is in the state in which power control state information (PSState) with a value of "IDLE" 112 is output (step S261), the interface unit 22 is in the state (the active state) in which data transmission/reception is possible (step S271), the link pulse generator 73 is in the state in which the PMD-TX 23 is in the on-state (step S281), and the link pulse detector 72 is in the state in which reception of an optical signal by the PMD-RX 24 is being monitored (step S291).

In this status, for example, if a user performs an operation to turn off the power of the host 12, then, in step 5252, the host 12 sends a turn-off command to the network interface 11. Thereafter, in step 5253, the host 12 turns off the power thereof.

If the PS manager 71 receives this turn-off command in step 5262, then, in step 5263, the PS manager 71 switches the value of the power control state information (PSState) into "OFF". If the interface unit 22 receives the turn-off command in step 5272, then, in step 5273, the interface unit 22 turns off the power thereof. On the other hand, if the link pulse generator 73 receives the turn-off command in step 5282, then, in step S283, the link pulse generator 73 turns off the optical signal output from the PMD-TX 23. Thereafter, in step 5284, the link pulse generator 73 turns off the power thereof. On the other hand, if the link pulse detector 72 receives the turn-off command in step 5292, then in step 5293, the link pulse detector 72 turns off the power thereof.

The manner of controlling the states of various parts has been described above.

In the examples described above with reference to FIGS. 8 and 10, no detection of received light ("No" state) causes transition to occur from the idle state (IDEL) 112 to the active state (ACTIVE) 113 or the passive state (PASSIVE) 114. Note that a similar transition also occurs in response to a detection of a passive link pulse signal (PLP) as described above with reference to FIG. 3.

On the other hand, in the examples described above with reference to FIGS. 9 and 11, a transition from the active state (ACTIVE) 113 or the passive state (PASSIVE) 114 to the idle state (IDLE) 112 occurs when the link pulse detector 72 detects an active link pulse signal (ALP). Note that a similar transition also occurs when a received light has been continuously detected for a predetermined period (the NOISE state), as described above with reference to FIG. 3.

When transitions described above occur, the respective parts operate as described below.

First, with reference to a flow chart shown in FIG. 13, a link pulse signal detection process performed by the link pulse detector 72 is described.

When power is turned on, the link pulse detector 72 starts the link pulse signal detection process. In step S311, the link pulse detector 72 starts monitoring reception of signal light (RX-PD) by the PMD-RX 24.

After the start of monitoring of reception of signal light, in step 5312, the link pulse detector 72 determines whether the PMD-RX 24 has continuously received an optical signal for a predetermined period of time, from the detection result (RXPD). If it is determined that an optical signal has been continuously detected, then in step S313, the link pulse detector 72 changes the value of the received link pulse state information (RxLinkState) into "NOISE". After completion of step S313, the link pulse detector 72 returns the processing flow to step 5312 to repeat the process from step 5312.

In a case in which it is determined n step 5312 that the PMD-RX 24 has not detected a continuous optical signal (for the predetermined period of time), the link pulse detector 72 advances the process to step 5314. In step 5314, the link pulse detector 72 determines whether an active link pulse signal (ALP) has been detected. If it is determined that an active link pulse signal (ALP) has been detected, the link pulse detector 72 advances the process to step S315. In step 5315, the link pulse detector 72 changes the value of the received link pulse state information (RxLinkState) into "ALP". After completion of step 5315, the link pulse detector 72 returns the processing flow to step 5312 to repeat the process from step S312.

In the case where it is determined in step 5314 that no active link pulse signal (ALP) has been detected, the link pulse detector 72 advances the process to step 5316. In step 5316, the link pulse detector 72 determines whether a passive link pulse signal (PLP) has been detected. If it is determined that a passive link pulse signal (PLP) has been detected, the link pulse detector 72 advances the process to step 5317. In step 5317, the link pulse detector 72 changes the value of the received link pulse state information (RxLinkState) into "PLP". After completion of step 5317, the link pulse detector 72 returns the processing flow to step 5312 to repeat the process from step 5312.

In the case where it is determined in step 5316 that no passive link pulse signal (PLP) has been detected, the link pulse detector 72 advances the process to step 5318. In step 5318, the link pulse detector 72 determines whether the PMD-RX 24 has not detected an optical signal for a predetermined period of time. If it is determined that no optical signal has been detected, the link pulse detector 72 advances the process to step 5319. In step 5319, the link pulse detector 72 changes the value of the received link pulse state information (RxLinkState) into "NO". After completion of step 5319, the link pulse detector 72 returns the processing flow to step 5312 to repeat the process from step 5312.

If it is determined in step 5318 that an optical signal has been detected, the link pulse detector 72 advances the process to step 5320. In step 5320, the link pulse detector 72 determines whether to end the link pulse signal detection process. If it is determined that the link pulse signal detection process should not be ended, the link pulse detector 72 returns the processing flow to step 5312 to repeat the process from step 5312. If it is determined in step 5320 that the link pulse signal detection process should be ended, the link pulse detector 72 advances the process to step 5321. In step 5321, the link pulse detector 72 ends the monitoring of reception of an optical signal by the PMD-RX 24 and ends the link pulse signal detection process.

As described above, in the link pulse detection process, the link pulse detector 72 detects a link pulse signal supplied from another communication apparatus and notifies the PS manager 71 of the detection result. If the PS manager 71 receives the information on the link pulse signal from the link pulse detector 72, the PS manager 71 properly controls the states of the various parts depending on the state of the another communication apparatus, thereby optimally reducing the power consumption of the network interface 11.

Now, referring to flow charts shown in FIGS. 14 to 17, examples of flows of the power control process performed by the PS manager 71 are described below.

When power is turned on, the controller 101 of the PS manager 71 starts the power control process. First, in step S351, the power control state information supply unit 104 sets the value of the power control state information (PSState) to "IDLE" 112 to be supplied to the MAC frame generator 31, the PCS 32, and the link pulse generator 73.

In step 5352, the controller 101 accepts PS mode information (PSMode). In step 5353, the controller 101 determines whether the PS mode has been switched. If it is determined that the PS mode has been switched, the controller 101 advances the process to step 5354. In step S354, the controller 101 updates the PS mode information (PSMode) stored in the PS mode information storing unit 102 according to the PS mode information (PSMode), and switches the PS mode. Thereafter, the controller 101 advances the process to step 5355. On the other hand, if it is determined in step 5353 that the PS mode has not been switched, the controller 101 advances the process to step S355.

In step 5355, the received link pulse state information accepting unit 103 accepts received link pulse state information (RxLinkState). In step 5356, a determination is made as to whether the accepted received link pulse state information (RxLinkState) has a value of "NO" or "PLP". If it is determined that the value of the accepted received link pulse state information (RxLinkState) is neither "NO" nor "PLP", the received link pulse state information accepting unit 103 advances the process to step S357.

In step 5357, the controller 101 determines whether a power-off command has been issued by the host 12. If it is determined that the power-off command has not been issued, the process proceeds to step 5358. In step 5358, the controller 101 determines whether to end the power control process. If it is determined that the power control process should not be ended, the controller 101 returns the process to step 5352 to repeat the process therefrom.

On the other hand, if it is determined in step 5358 that the power control process should be ended, the controller 101 ends the power control process.

If it is determined in step 5357 that the power-off command has been issued by the host 12, the controller 101 advances the process to step 5371 shown in FIG. 15. In step S371 shown in FIG. 15, the power control state information supply unit 104 changes the value of the power control state information (PSState) into "OFF" 111. In step 5372, the controller 101 determines whether a power-on command has been issued by the host 12. If it is determined that the power-on command has not been issued, the controller 101 advances the process to step 5373. In step 5373, the controller 101 determines whether to end the power control process.

In the case where it is determined in step 5373 that the power control process should not be ended, the controller 101 returns the processing flow to step 5372 to repeat the process from step 5372. On the other hand, in the case where it is determined in step 5373 that the power control process should be ended, the controller 101 ends the power control process. In the case where it is determined in step 5372 that the power-on command has been issued, the controller 101 returns the process to step 5351 shown in FIG. 14 to repeat the process therefrom.

If it is determined in step 5356 in FIG. 14 that the value of the accepted received link pulse state information (RxLinkState) is "NO" or "PLP", the received link pulse state information accepting unit 103 advances the process to step 5359. In step 5359, the PS mode information storing unit 102 determines whether the PS mode information (PSMode) stored therein has a value of "Normal Mode". If it is determined that the stored PS mode information (PSMode) has a value of "Normal Mode", the process proceeds to step 5391 in FIG. 16.

In step 5391 in FIG. 16, the power control state information supply unit 104 sets the value of the power control state information (PSState) to "ACTIVE" 113. In step 5392, the received link pulse state information accepting unit 103 accepts received link pulse state information (RxLinkState). In step 5393, a determination is made as to whether the accepted received link pulse state information (RxLinkState) has a value of "ALP" or "NOISE". If it is determined that the value of the received link pulse state information (RxLinkState) is neither "ALP" nor "NOISE", the controller 101 advances the process to step S394. In step S394, the controller 101 determines whether to end the power control process. In the case where it is determined in step S394 that the power control process should not be ended, the controller 101 returns the processing flow to step S392 to repeat the process from step S392. On the other hand, in the case where it is determined in step S394 that the power control process should be ended, the controller 101 ends the power control process.

In the case where it is determined in step 5393 that the value of the received link pulse state information (RxLinkState) is "ALP" or "NOISE", the controller 101 returns the processing flow to step S351 shown in FIG. 14 to repeat the process therefrom.

In the case where it is determined in step 5359 in FIG. 14 that the value of the stored PS mode information (PSMode) is not "Normal Mode", the PS mode information storing unit 102 advances the process to step 5411 shown in FIG. 17.

In step 5411 in FIG. 17, the power control state information supply unit 104 sets the power control state information (PSState) so as to have a value of "PASSIVE" 114. In step 5412, the received link pulse state information accepting unit 103 accepts received link pulse state information (RxLinkState). In step 5413, a determination is made as to whether the accepted received link pulse state information (RxLinkState) has a value of "ALP" or "NOISE". If it is determined that the accepted received link pulse state information (RxLinkState) has a value of "ALP" or "NOISE", the process proceeds to step 5414. In step S414, the wake command supply unit 105 supplies a wake command (WAKE) to the host 12. After completion of step 5414, the controller 101 returns the processing flow to step 5351 shown in FIG. 14 to repeat the process therefrom.

If it is determined in step 5413 in FIG. 17 that the value of the accepted received link pulse state information (RxLinkState) is neither "ALP" nor "NOISE", the controller 101 advances the process to step 5415. In step 5415, the controller 101 determines whether to end the power control process. If it is determined that the power control process should not be ended, the controller 101 returns the processing flow to step 5412 to repeat the process therefrom. On the other hand, if it is determined in step 5415 that the power control process should be ended, the controller 101 ends the power control process.

The PS manager 71 controls the power of the various parts in the above-described manner depending on the state of the host 12 and the state of an apparatus with which the host 12 is communicating so as to minimize the power consumption.

Now, with reference to a flow chart shown in FIG. 18, a link pulse signal generation process performed by the link pulse generator 73 is described below.

When power is turned on, the link pulse generator 73 starts the link pulse signal generation process. In step S431, a determination is made as to whether the value of the power control state information (PSState) is "IDLE" 112. If it is determined that the value of the power control state information (PSState) is "IDLE" 112, the process proceeds to step 5432. In step 5432, the link pulse generator 73 turns on the PMD-TX 23 to output an optical signal. After completion of step 5432, the link pulse generator 73 returns the processing flow to step 5431 to repeat the process therefrom.

If it is determined in step 5431 that the value of the power control state information (PSState) is not "IDLE" 112, the link pulse generator 73 advances the process to step S433. In step 5433, it is determined whether the value of the power control state information (PSState) is "ACTIVE" 113. If it is determined that the value of the power control state information (PSState) is "ACTIVE" 113, the process proceeds to step 5434. In step S434, the link pulse generator 73 controls the PMD-TX 23 so as to transmit an active link pulse signal (ALP) by turning on and off the signal light. After completion of step 5434, the link pulse generator 73 returns the processing flow to step 5431 to repeat the process therefrom.

In the case in which it is determined in step S433 that the value of the power control state information (PSState) is not "ACTIVE" 113, the link pulse generator 73 advances the process to step S435. In step 5435, the link pulse generator 73 determines whether the value of the power control state information (PSState) is "PASSIVE" 114. If it is determined that the value of the power control state information (PSState) is "PASSIVE" 114, the link pulse generator 73 advances the process to step S436. In step S436, the link pulse generator 73 controls the PMD-TX 23 so as to transmit a passive link pulse signal (PLP) by turning on and off the signal light. After completion of step 5436, the link pulse generator 73 returns the processing flow to step 5431 to repeat the process therefrom.

In the case where it is determined in step 5435 that the value of the power control state information (PSState) is not "PASSIVE" 114, the link pulse generator 73 determines that the power control state information (PSState) has a value of "OFF" 111, and the link pulse generator 73 advances the process to step 5437. In step S437, the link pulse generator 73 turns off the PMD-TX 23 so as to output no signal light. After completion of step 5437, the link pulse generator 73 ends the link pulse signal generation step.

The link pulse generator 73 performs the link pulse signal generation process described above periodically at predetermined regular time intervals or repeatedly at irregular time intervals (in response to occurrences of particular events).

By performing the process in the above-described manner under the control of the PS manager 71, the link pulse generator 73 notifies another communication apparatus, with which to communicate, of the statues of the network interface 11. When no data is being transmitted in communication, the status is switched into the active state (ACTIVE) 113 or the passive state (PASSIVE) 114 and the link pulse generator 73 outputs a link pulse signal via the PMDTX 23 with a low duty ratio thereby reducing the power consumption of the network interface 11.

Referring again to FIG. 1, the host interface controller 21, the MAC frame generator 31, and the PCS 32 each have both a data transmission capability and a data receiving capability. More specifically, for example, as shown in FIG. 19, the host interface controller 21 includes a control unit 211 adapted to process control information, a data-to-be-transmitted transfer unit 212 adapted to transfer transmit-data supplied from the host 12 to the MAC frame generator 31, and a received data transfer unit 213 adapted to transfer received data supplied from the MAC frame generator 31 to the host 12.

The control unit 211 controls the operation of the data-to-be-transmitted transfer unit 212 and the received data transfer unit 213 in accordance with control information supplied from the host 12 or the PS manager 71 via the bus 81 or the bus 82. The control unit 211 is also adapted to relay control information between the host 12 and the PS manager 71. The data-to-be-transmitted transfer unit 212 transfers the transmit-data supplied from the host 12 via the bus to the MAC frame generator 31 via the bus 42. The received data transfer unit 213 transfers the received data supplied from the MAC frame generator 31 via the bus 54 to the host 12 via the bus 55.

Figure 19:
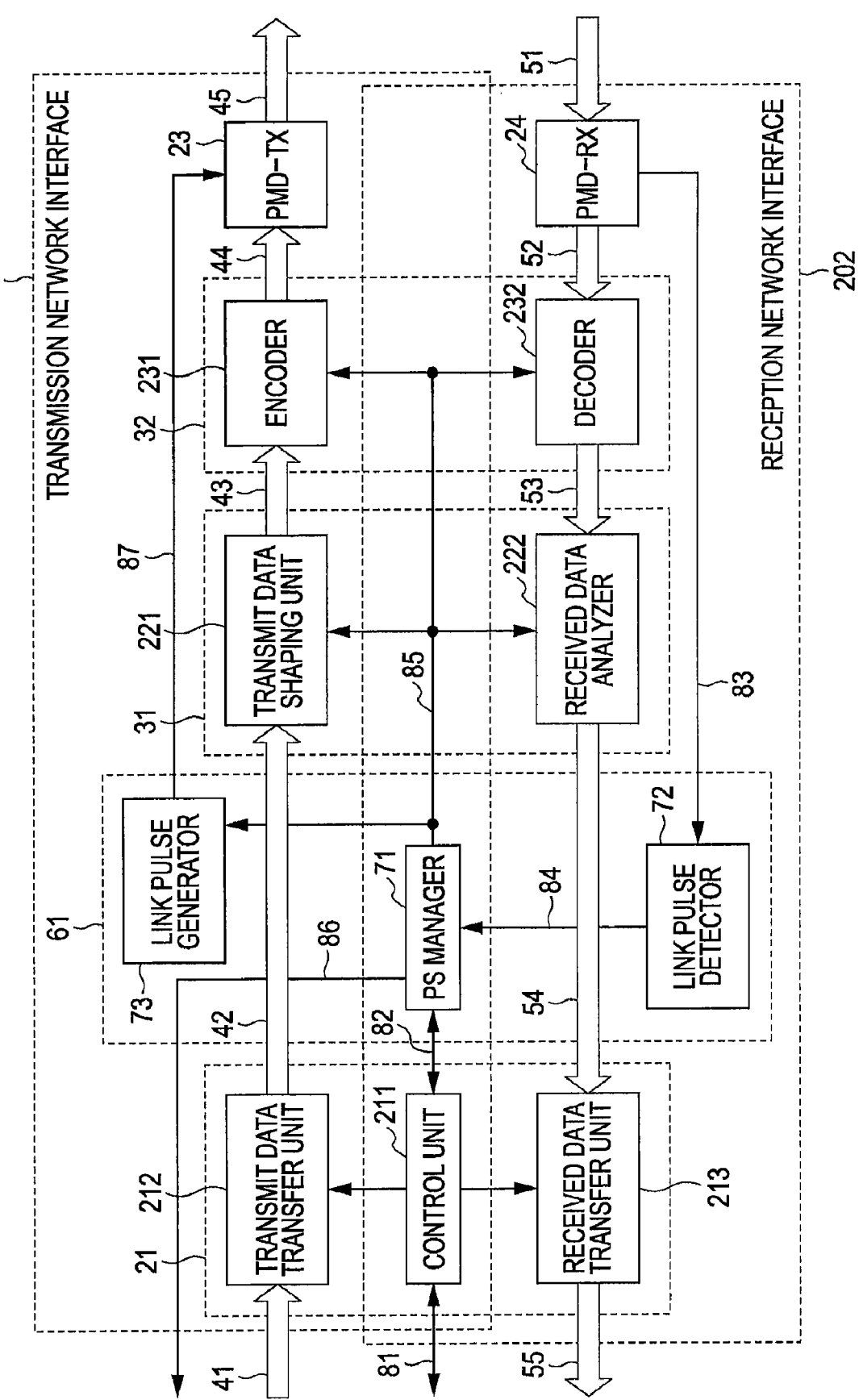
FIG. 19 is a block diagram showing another example of a configuration of a network interface according to an embodiment.

On the other hand, the MAC frame generator 31 includes, as shown in FIG. 19, a transmit-data shaping unit 221 adapted to shape the transmit data and a received data analyzer 222 adapted to analyze the received data. The transmit-data shaping unit 221 shapes transmit-data supplied from the data-to-be-transmitted transfer unit 212 via the bus 42 thereby generating a MAC frame and supplies the resultant MAC frame to an encoder 231 via the bus 43. The received data analyzer 222 extracts an IP packet by analyzing the received data supplied from the PCS 32 via the bus 53, and supplies the resultant IP packet to the received data transfer unit 213 via the bus 54.

On the other hand, as shown in FIG. 9, the PCS 32 includes the encoder 231 adapted to encode the transmit-data and a decoder 232 adapted to decode the received data. The encoder 231 encodes the transmit-data supplied from the transmit-data shaping unit 221 via the bus 43 and supplies the resultant encoded transmit-data to the PMD-TX 23 via the bus 44. The decoder 232 decodes the received data supplied from the PMD-RX via the bus 52 and supplies the resultant decoded data to the received data analyzer 222 via the bus 53.

The PS manager 71 supplies power control state information (PSState) to the transmit-data shaping unit 221 and the received data analyzer 222 of the MAC frame generator 31 and also to the encoder 231 and the decoder 232 of the PCS 32.

That is, the network interface 11 (the communication apparatus) shown in FIG. 1 includes, as shown in FIG. 19, a transmission network interface section 201 (a transmitter) serving as an interface dedicated to transmission and a reception network interface section 202 (a receiver) serving as an interface dedicated to reception.

In this configuration, the state controller 61 in the transmission network interface section 201 includes the PS manager 71 and the link pulse generator 73. The PS manager 71 sets the value of the power control state information (PSState) in accordance with the state of the host 12 or in accordance with a command supplied from the host 12. In accordance with this power control state information (PSState), the link pulse generator 73 controls the transmission of the link pulse signal. That is, the transmission network interface section 201 is capable of notifying another communication apparatus of the state of the transmission network interface section 201 by sending the link pulse signal or the signal light, although the transmission network interface section 201 is not capable of detecting a link pulse signal transmitted from another communication apparatus.

On the other hand, the state controller 61 in the reception network interface section 202 includes the PS manager 71 and the link pulse detector 72. The PS manager 71 sets the value of the power control state information (PSState) in accordance with the state of the host 12 or in accordance with a result of detection by the link pulse detector 72. That is, although the reception network interface section 202 is capable of detecting a link pulse signal transmitted by another communication apparatus and controlling the status in accordance with the detected link pulse signal, the reception network interface section 202 is not capable of notifying another communication apparatus of the state of the reception network interface section 202 by sending a link pulse signal or signal light.

The transmission network interface section 201 may be configured so as to further include a link pulse detector 72 and a PMD-RX 24 thereby making it possible to detect a link pulse signal transmitted from another communication apparatus and control the state in accordance with the detected link pulse signal. On the other hand, the reception network interface section 202 may be configured so as to further include a link pulse generator 73 and a PMD-TX 23 thereby making it possible to notify another communication apparatus of the state of the reception network interface section 202 by sending a link pulse signal or signal light.

As described above, the network interface 11 is capable of transmitting and receiving information associated with the state by turning on and off physical signal light. That is, the network interface 11 may be applied to a network system in which a plurality of apparatuses are connected to each other.

Figure 20A:
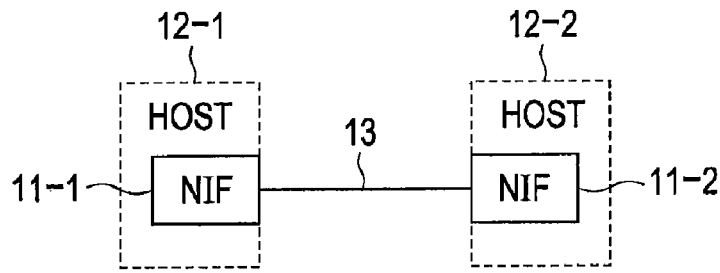
FIGS. 20A to 20D are diagrams showing examples of configurations of a network system using a network interface according to an embodiment.

In an example of a network system shown in FIG. 20A, two network interfaces are connected to each other via an optical cable 13 such that the two network interfaces 11 are capable of communicating with each other via the optical cable 13. More specifically, in this network system shown in FIG. 20A, a network interface (NIF) 11-1 and a NIF 11-2 which are similar to the network interface 11 are connected to each other via the optical cable 13 such that they are capable of communicating with each other via the optical cable 13, whereby a host 12-1 and a host 12-2 similar to the host 12 shown in FIG. 1 are allowed to communicate with each other via the NIF 11-1 and the NIF 11-2.

In the example of the network system shown in FIG. 20A, each of the NIF 11-1 and the NIF 11-2 controls the state thereof depending on the state of the other NIF in the above-described manner so as to reduce the power consumption. More specifically, for example, when the NIF 11-2 is not connected to the NIF 11-1 or when the NIF 11-2 is in the off-state (OFF) 111 or the passive state (PASSIVE) 114, the NIF 11-1 changes the state thereof from the idle state (IDLE) 112 into the active state (ACTIVE) 113 or the passive state (PASSIVE) 114, whereby the interface unit 22 is put into the sleep state and the link pulse signal is output by turning on and off the signal light with a low duty ratio thereby reducing the power consumption. On the other hand, when the NIF 11-2 is in the idle state (IDLE) 112 or the active state (ACTIVE) 113, the NIF 11-1 changes the state thereof from the active state (ACTIVE) 113 or the passive state (PASSIVE) 114 into the idle state (IDLE) 112 so that communication with the NIF 11-2 becomes possible. In this network system, as a matter of course, the other functions described above with reference to FIGS. 1 to 19, such as the function of waking-up of the host 12 can also be realized.

The NIF 11-2 can also operate similar manner to the NIF 11-1.

Figure 20B:
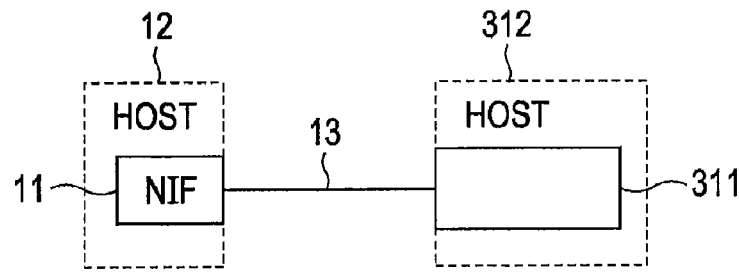

Note that the network interface 11 is capable of communicating with a conventional communication apparatus which does not have the capability associated with the link pulse. FIG. 20B shows an example of such a network system.

In this example of the network system shown in FIG. 20B, a NIF 11 (similar to the network interface 11 shown in FIG. 1) is connected to a conventional NIF 311 of a host 312 via an optical cable 13 such that communication is possible between the NIF 11 and the NIF 311 via the optical cable 13. Although the conventional NIF 311 is capable of transmitting and receiving data, the conventional NIF 311 is not capable of transmitting/receiving a link pulse signal generated by turning on/off signal light. Although the NIF 11 cannot acquire a link pulse signal from the conventional NIF 311, the NIF 11 can detect turning-on/off of the signal light (because the NIF 311 has a "NO" state and a "NOISE" state), and thus the NIF 11 can control the state thereof in a similar manner as described above with reference to FIG. 3 to effectively reduce the power consumption.

For example, when the NIF 311 is not connected to the NIF 11 or when the NIF 311 is in the off-state (OFF) 111, the NIF 11 changes the state thereof from the idle state (IDLE) 112 into the active state (ACTIVE) 113 or the passive state (PASSIVE) 114, whereby the interface unit 22 is put into the sleep state and the link pulse signal is output by turning on and off the signal light with a low duty ratio thereby reducing the power consumption. When the NIF 311 is in the idle state (IDEL) 112, the NIF 11 changes the state thereof from the active state (ACTIVE) 113 or the passive state (PASSIVE) 114 into the idle state (IDLE) 112 so that communication with the NIF 11-2 becomes possible. In this network system, as a matter of course, the other functions described above with reference to FIGS. 1 to 19, such as the function of waking-up of the host 12 can also be realized.

In the system shown in FIG. 20B, the link pulse detector 72 of the NIF 11 may determine whether a NIF with which to start communication is a conventional-type NIF by analyzing an incoming link pulse signal (for example, if no link pulse signal is detected for a predetermined period of time, it is determined that the NIF is of the conventional type), and the state of the NIF 11 may be controlled depending on the analysis result. For example, if the NIF with which the NIF 11 is communicating is determined as being of the conventional type, the link pulse generator 73 of the NIF 11 may control the PMD-TX 23 such that no link pulse signal is output.

As described above, the network interface 11 shown in FIG. 1 is also capable of communicating with a communication apparatus of the conventional type and capable of reducing power consumption during the communication with communication apparatus of the conventional type The host 12 shown in FIG. 1 may be a terminal device such as a personal computer or an AV device or may be a delay device such as a switching hub, a router or a bridge. The host 12 may include a plurality of network interfaces 11 to simultaneously communicate with a plurality of apparatuses.

Figure 20C:
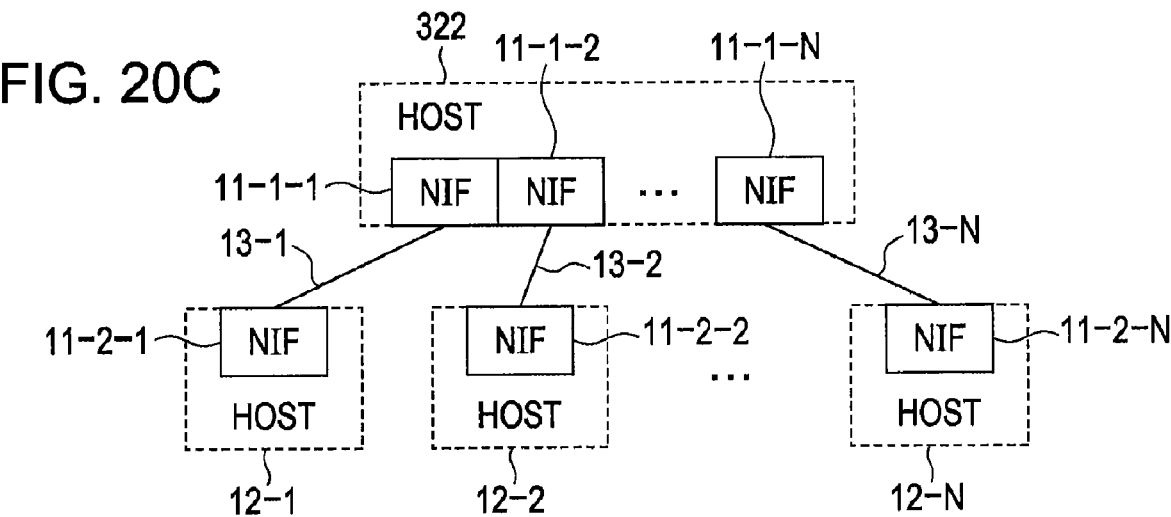

FIG. 20C shows an example of a network system in which a plurality of terminal apparatuses are connected to each other via a switching hub. In this network system shown in FIG. 20C, a host 322 serves as the switching hub having N ports. To this end, the host 322 has N network interfaces similar to the network interface 11 shown in FIG. 1 for respective N ports. That is, the host 322 includes a NIF 11-1-1 to a NIF 11-1-N.

The NIFs 11-1-1 to 11-1-N are respectively connected to NIFs 11-2-1 to 11-2-N serving as interfaces of respective hosts 12-1 to 12-N via optical cables 13-1 to 13-N.

In this configuration, the hub 322 controls the state thereof separately for each port thereby optimally reducing the power consumption. For example, the hub 322 puts the state into the active state (ACTIVE) 113 or the passive state (PASSIVE) 114 for NIFs of ports which are connected to no apparatus or which are connected to an apparatus in the off-state (OFF) 111, and the hub 322 puts the state into idle state (IDLE) 112 for NIFs of ports via which communication is being performed or is going to be performed.

As described above, the network interface 11 is capable of not only controlling the state thereof but also notifying an apparatus, with which communication is being performed, of the state of the network interface 11 to allow the apparatus being in communication to reduce the power consumption thereof in a similar manner to the network interface 11. That is, the network interface 11 is capable of reducing the overall power consumption of the network system.

Figure 20D:
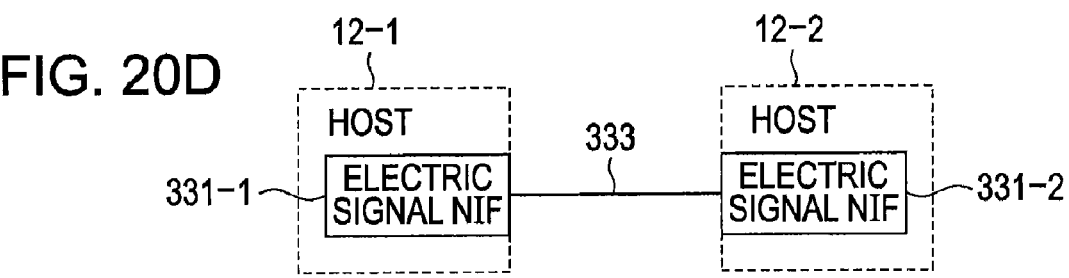

In the embodiments described above, it is assumed that data is transmitted in the form of an optical signal. Alternatively, as in an example shown in FIG. 20D, data may be transmitted in the form of an electric signal. To this end, in the example shown in FIG. 20D, hosts 12-1 and 12-2 have electric signal NIFs 331-1 and 331-2, respectively. In this configuration, information indicating the off-state (OFF) 111, the idle state (IDLE) 112, the active state (ACTIVE) 113, or the passive state (PASSIVE) 114 is transmitted by an electric pulse signal (similar to a link pulse signal).

In the embodiments described above, it is assumed that the network interface 11 is installed in the host 12. Alternatively, the network interface 11 may be installed separately from the host 12.

The sequence of processes described above may be performed by hardware or software. When the sequence of processes is executed by software, a program embodying the software may be installed via a network or a storage medium.

Figure 21:
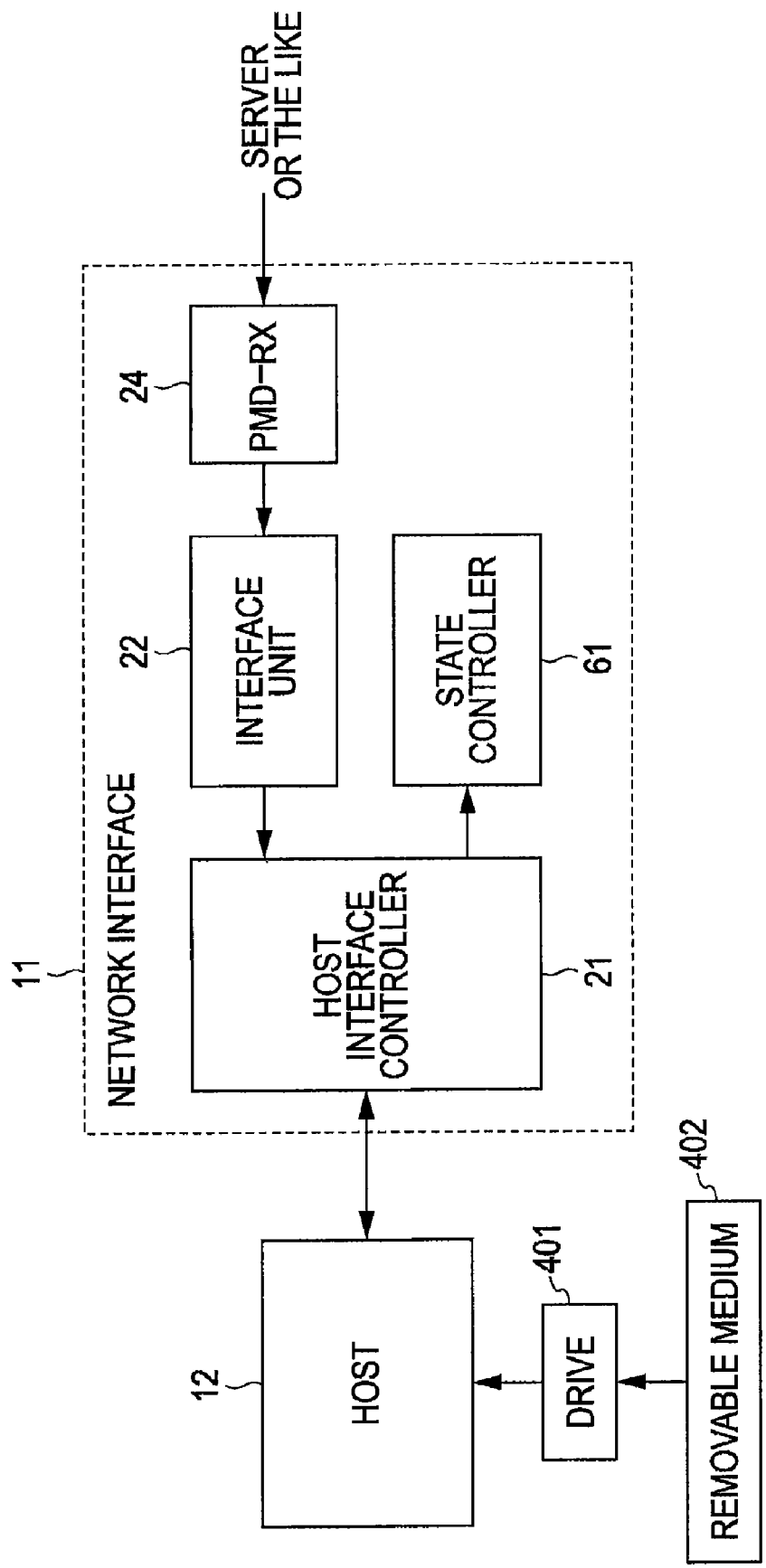
FIG. 21 is a diagram showing an example of a manner in which a program is installed according to an embodiment.

For example, as shown in FIG. 21, the program may be stored on a removable medium 402 such as a magnetic disk (such as a floppy disk), an optical disk (such as a CD-ROM (Compact Disk-Read Only Memory) disk, a DVD (Digital Versatile Disk), etc.), a magneto-optical disk (such as a MD (Mini-Disk)®, or a semiconductor memory, and the program may be installed from the removable medium 402 into the apparatus. The program may also be stored in a ROM or a hard disk preinstalled in the apparatus, and the apparatus including the preinstalled program may be provided to a user.

FIG. 21 shows an example of a manner in which the program is installed into the state controller 61 of the network interface 11 according to an embodiment of the present invention. When the removable medium 402 on which the program has been stored in advance is mounted on a drive 401 connected to the host 12, the host 12 reads the program from the removable medium 402 via the drive 401 and transfers the program to the state controller 61 via the host interface controller 21 thereby installing the program.

Alternatively, the host 12 may acquire the program transmitted from a server or the like by receiving it via the PMD-RX 24, the interface unit 22 and the host interface controller 21 of the network interface 11, and the host 12 may supply the acquired program to the state controller 61 via the host interface controller 21 thereby installing the program.

In the present description, the steps described in the program stored in the storage medium may be performed either in time sequence in accordance with the order described in the program or in a parallel or separate fashion.

In the present description, the term "system" is used to describe the entirety of an apparatus including a plurality of sub-apparatuses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communication apparatus comprising:
   a transmission unit adapted to transmit data via a network,
   a receiving unit adapted to receive data supplied via the network;
   an interface unit adapted to supply to-be-transmitted data to the transmission unit and extract particular information from data received by the receiving unit;
   control means for controlling an operation state of the interface unit, the control means including state setting means for outputting state setting information indicating an operation state into which to set the communication apparatus, the interface unit being configured to switch the operation state in accordance with the state setting information set by the state setting means;
   the control means being configured to control:
   (a) switching of the operation state of the interface unit between a transmission/reception-enabled state in which a process associated with transmission of data to be transmitted and a process associated with reception of incoming data are possible; and
   (b) a sleep state in which operation is stopped to reduce power consumption; and
   the state setting means being configured to output, as the state setting information, information indicating one of the following states:
   (a) an idle state in which transmission and reception of information is possible;
   (b) an active state in which an information processing apparatus adapted to transmit and receive data via the communication apparatus is in a transmission/reception-enabled state in which transmission/reception is possible and the interface unit is in a sleep state in which operation is stopped to reduce power consumption;
   (c) a passive state in which both the interface unit and the information processing apparatus are in the sleep state; and
   (d) an off-state in which no electric power is supplied and no operation is performed, wherein when the state setting information specifies the active state or the passive state, the interface unit goes into the sleep state, while when state setting information specifies the idle state, the interface unit goes into the state in which transmission and reception are possible.

2. The communication apparatus according to claim 1, wherein the interface unit includes a data shaping/analyzing unit and an encoding/decoding unit, the data shaping/analyzing unit configured to shape data to be transmitted and analyze received data, the encoding/decoding unit being adapted to encode data to be transmitted and decode received data, and wherein the control means controls both the data shaping/analyzing unit and the encoding/decoding unit.

3. The communication apparatus according to claim 1, wherein the control means further includes state notification producing means for producing, in accordance with the state setting information, state notification information which indicates the operation state of the present communication apparatus and which is to be sent to another communication apparatus via the transmission unit.

4. The communication apparatus according to claim 3, wherein the state notification producing means outputs a link pulse signal such that
when the state setting information indicates the active state, the state notification producing means outputs an active link pulse signal corresponding to the active state, while when the state setting information indicates the passive state, the state notification producing means outputs a passive link pulse signal corresponding to the possible state and being different from the active link pulse signal.

5. The communication apparatus according to claim 4, wherein
the transmission unit is an optical transmitter adapted to output signal light, and
the state notification producing means operates such that
when the state setting information specifies the idle state, the state notification producing means causes the transmission unit to start outputting the signal light,
when the state setting information specifies the off-state, the state notification producing means causes the transmission unit to stop outputting the signal light,
when the state setting information specifies the active state, the state notification producing means controls turning-on/off of the signal light output by the transmission unit so as to output the active link pulse signal, and
when the state setting information specifies the passive state, the state notification producing means controls turning-on/off of the signal light output by the transmission unit so as to output the passive link pulse signal.

6. The communication apparatus according to claim 1, wherein
the control means further includes state notification detection means for detecting state notification information supplied from another communication apparatus, from the signal received by the receiving unit, and
the state setting means outputs the state setting information according to a result of the detection by the state notification detection means.

7. The communication apparatus according to claim 6, wherein the state setting means sets the state setting information such that when the state setting information indicates the idle state, if the result of the detection by the state notification detection means is a failure of detection of the received signal by the receiving unit, or if the result of the detection is a detection of a passive link pulse signal in the form of a pulse sequence corresponding to the passive state, then the state setting means sets the state setting information so as to indicate the active state, if the information processing apparatus is in the transmission/reception-enabled state.

8. The communication apparatus according to claim 6, wherein the state setting means sets the state setting information such that when the state setting information indicates the idle state, if the result of the detection by the state notification detection means is a failure of detection of the received signal or if the result of the detection is a detection of a passive link pulse signal in the form of a pulse sequence corresponding to the passive state, then the state setting means sets the state setting information so as to indicate the passive state, if the information processing apparatus is in the sleep state.

9. The communication apparatus according to claim 6, wherein the state setting means sets the state setting information such that when the state setting information indicates the active state, if the result of the detection by the state notification detection means is a detection of the received signal over a predetermined period of time or if the result of the detection is a detection of an active link pulse signal in the form of a pulse sequence corresponding to the active state, then the state setting means sets the state setting information so as to indicate the idle state.

10. The communication apparatus according to claim 6, wherein the state setting means sets the state setting information such that when the state setting information indicates the passive state, if the result of the detection by the state notification detection means is a detection of the received signal over a predetermined period of time or if the result of the detection is a detection of an active link pulse signal in the form of a pulse sequence corresponding to the active state, then the state setting means sets the state setting information so as to indicate the idle state and furthermore the state setting means outputs activation control information to the information processing apparatus to change the state of the information processing apparatus from the sleep state into the transmission/reception-enabled state.

11. The communication apparatus according to claim 6, wherein
the receiving unit is an optical receiver adapted to receive an optical signal, and
the state notification detection means detects a state notification on the basis of a turning-on/off pattern of the optical signal received by the receiving unit.

12. A communication method for communication by a communication apparatus comprising a transmission unit adapted to transmit data via a network, a receiving unit adapted to receive data supplied via the network, and an interface unit adapted to supply to-be-transmitted data to the transmission unit and extract particular information from data received by the receiving unit, the method comprising:
causing a controller to control an operation state of the interface unit, the controller including a state setting means for outputting state setting information indicating an operation state into which to set the communication apparatus;
causing the interface unit to switch the operation state in accordance with the state setting information set by the state setting means;
causing the controller to control:
(a) switching of the operation state of the interface unit between a transmission/reception-enabled state in which a process associated with transmission of data to be transmitted and a process associated with reception of incoming data are possible; and
(b) a sleep state in which operation is stopped to reduce power consumption; and
causing the state setting means to output, as the state setting information, information indicating one of the following states:
(a) an idle state in which transmission and reception of information is possible;
(b) an active state in which an information processing apparatus adapted to transmit and receive data via the communication apparatus is in a transmission/reception-enabled state in which transmission/reception is possible and the interface unit is in a sleep state in which operation is stopped to reduce power consumption;
(c) a passive state in which both the interface unit and the information processing apparatus are in the sleep state; and (d) an off-state in which no electric power is supplied and no operation is performed, wherein when the state setting information specifies the active state or the passive state, the interface unit goes into the sleep state, while when state setting information specifies the idle state, the interface unit goes into the state in which transmission and reception are possible.

13. A computer program stored on a computer-readable medium including executable instructions that when executed by a processor perform processing steps associated with a communication apparatus comprising a transmission unit adapted to transmit data via a network, a receiving unit adapted to receive data supplied via the network, and an interface unit adapted to supply to-be-transmitted data to the transmission unit and extract particular information from data received by the receiving unit, said steps comprising:

causing a controller to control an operation state of the interface unit, the controller including a state setting means for outputting state setting information indicating an operation state into which to set the communication apparatus;

causing the interface unit to switch the operation state in accordance with the state setting information set by the state setting means;

causing the controller to control:
(a) switching of the operation state of the interface unit between a transmission/reception-enabled state in which a process associated with transmission of data to be transmitted and a process associated with reception of incoming data are possible; and
(b) a sleep state in which operation is stopped to reduce power consumption; and causing the state setting means to output, as the state setting information, information indicating one of the following states:
(a) an idle state in which transmission and reception of information is possible;
(b) an active state in which an information processing apparatus adapted to transmit and receive data via the communication apparatus is in a transmission/reception-enabled state in which transmission/reception is possible and the interface unit is in a sleep state in which operation is stopped to reduce power consumption;
(c) a passive state in which both the interface unit and the information processing apparatus are in the sleep state; and
(d) an off-state in which no electric power is supplied and no operation is performed, wherein when the state setting information specifies the active state or the passive state, the interface unit goes into the sleep state, while when state setting information specifies the idle state, the interface unit goes into the state in which transmission and reception are possible.

14. A communication apparatus comprising:
a transmission unit adapted to transmit data via a network;
a receiving unit adapted to receive data supplied via the network, and an interface unit adapted to supply to-be-transmitted data to the transmission unit and extract particular information from data received by the receiving unit;
a control unit configured to control an operation state of the interface unit, the control unit including a state setting unit for outputting state setting information indicating an operation state into which to set the communication apparatus, the interface unit being configured to switch the operation state in accordance with the state setting information set by the state setting unit the control unit being configured to control:
(a) switching of the operation state of the interface unit between a transmission/reception-enabled state in which a process associated with transmission of data to be transmitted and a process associated with reception of incoming data are possible; and
(b) a sleep state in which operation is stopped to reduce power consumption; and the state setting unit being configured to output, as the state setting information, information indicating one of the following states:
(a) an idle state in which transmission and reception of information is possible;
(b) an active state in which an information processing apparatus adapted to transmit and receive data via the communication apparatus is in a transmission/reception-enabled state in which transmission/reception is possible and the interface unit is in a sleep state in which operation is stopped to reduce power consumption;
(c) a passive state in which both the interface unit and the information processing apparatus are in the sleep state; and
(d) an off-state in which no electric power is supplied and no operation is performed, wherein when the state setting information specifies the active state or the passive state, the interface unit goes into the sleep state, while when state setting information specifies the idle state, the interface unit goes into the state in which transmission and reception are possible.

* * * * *